United States Patent
Patil et al.

(10) Patent No.: US 9,723,581 B2
(45) Date of Patent: Aug. 1, 2017

(54) SYSTEMS AND METHODS FOR ESTABLISHING SYNCHRONIZATION ACROSS MULTIPLE NETWORKS AND PARTICIPATING STAS VIA OPERATIONS ON A KNOWN COMMON CHANNEL

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 14/515,383

(22) Filed: Oct. 15, 2014

(65) Prior Publication Data

US 2015/0109981 A1    Apr. 23, 2015

Related U.S. Application Data

(60) Provisional application No. 61/893,090, filed on Oct. 18, 2013, provisional application No. 61/978,786, filed on Apr. 11, 2014.

(51) Int. Cl.
| | | |
|---|---|---|
| *H04W 56/00* | (2009.01) | |
| *H04L 29/08* | (2006.01) | |

(Continued)

(52) U.S. Cl.
CPC ....... *H04W 56/001* (2013.01); *H04L 67/1078* (2013.01); *H04W 24/08* (2013.01);
(Continued)

(58) Field of Classification Search
CPC .......... H04W 56/001; H04W 52/0212; H04W 48/16; H04W 52/0216; H04L 67/1078
See application file for complete search history.

(56) References Cited

U.S. PATENT DOCUMENTS

| | | | |
|---|---|---|---|
| 8,385,316 B2 | 2/2013 | Laroia et al. | |
| 2009/0010232 A1* | 1/2009 | Laroia ................. | H04W 56/002 370/338 |

FOREIGN PATENT DOCUMENTS

| | | |
|---|---|---|
| EP | 2605560 A1 | 6/2013 |
| WO | WO-2009009314 A1 | 1/2009 |
| WO | WO-2010071347 A2 | 6/2010 |

OTHER PUBLICATIONS

International Search Report and Written Opinion—PCT/US2014/060937—ISA/EPO—Dec. 19, 2014.

* cited by examiner

*Primary Examiner* — Robert M Morlan
*Assistant Examiner* — Kevin Lee
(74) *Attorney, Agent, or Firm* — Knobbe, Martens, Olson & Bear, LLP

(57) ABSTRACT

Systems and methods for establishing synchronized operations on a data delivery network are disclosed. In one aspect, a method includes receiving synchronization information for a neighbor aware network and for a second channel associated with a data delivery network (including a paging window for one of the networks), and receiving service data on the data delivery channels while maintaining synchronization on all data delivery channels using only the synchronization information from the neighbor aware network channel. The synchronization allows devices to increase efficiency by allowing them to sleep, wake-up, send or store data traffic, and receive or transmit indicators of stored data traffic, among other actions, in a coordinated manner such (Continued)

that the devices are awake at the same specified times (e.g., paging windows). Devices may then stay awake to receive or transmit traffic or sleep to conserve power if there is no traffic to send or receive.

30 Claims, 17 Drawing Sheets

(51) Int. Cl.
    *H04W 24/08*     (2009.01)
    *H04W 48/16*     (2009.01)
    *H04W 52/02*     (2009.01)
    *H04W 68/02*     (2009.01)
    *H04W 72/04*     (2009.01)

(52) U.S. Cl.
    CPC ....... *H04W 48/16* (2013.01); *H04W 52/0212* (2013.01); *H04W 52/0216* (2013.01); *H04W 68/02* (2013.01); *H04W 72/0446* (2013.01); *Y02B 60/50* (2013.01)

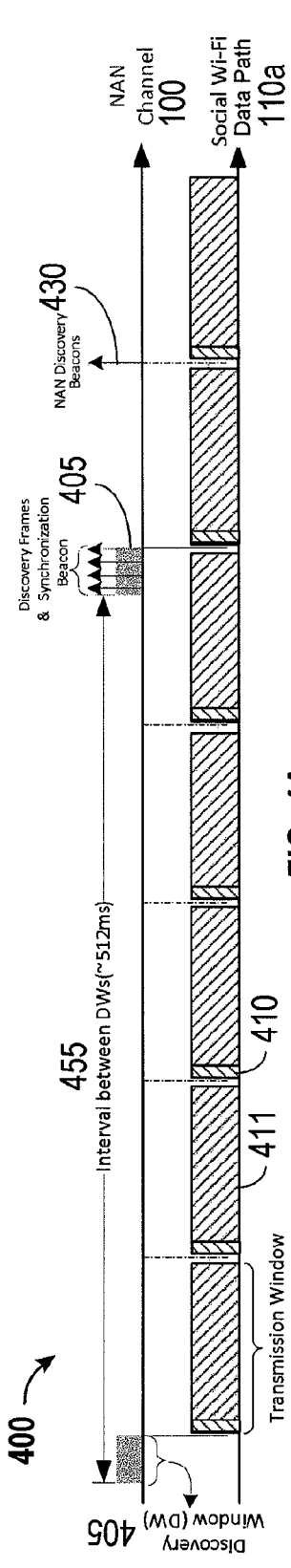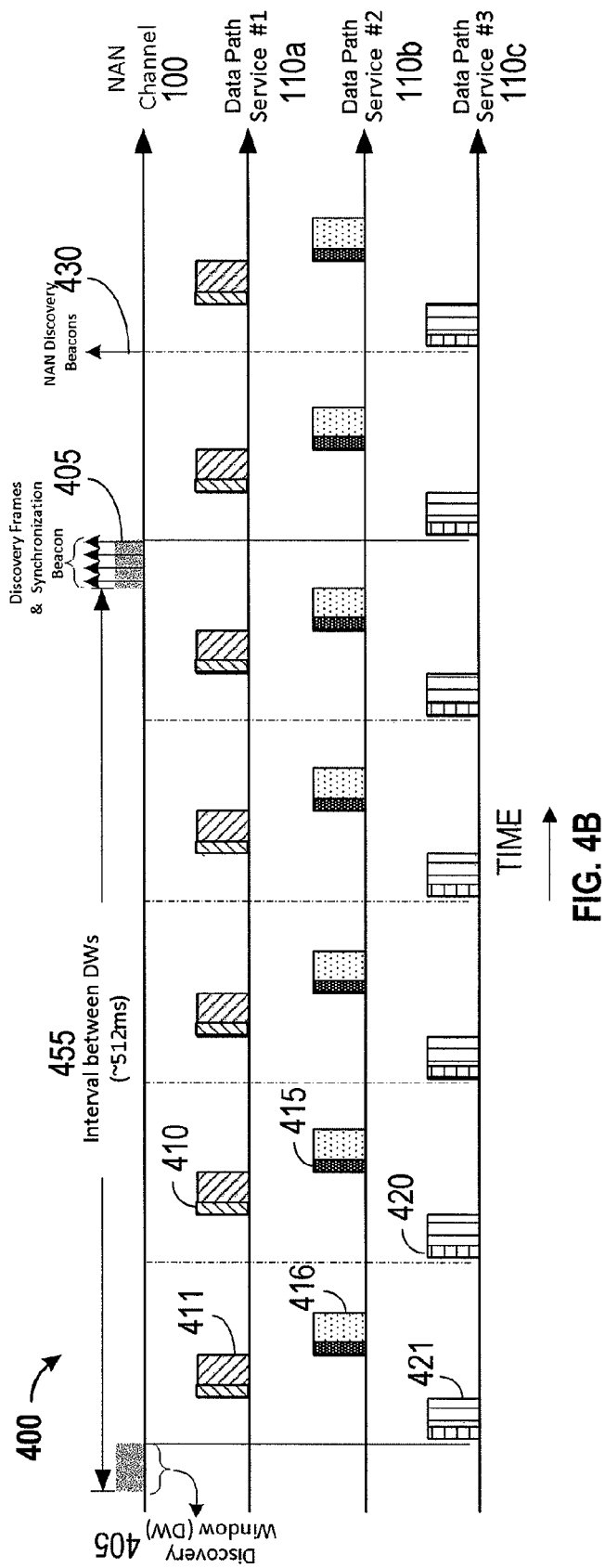
FIG. 4A
FIG. 4B

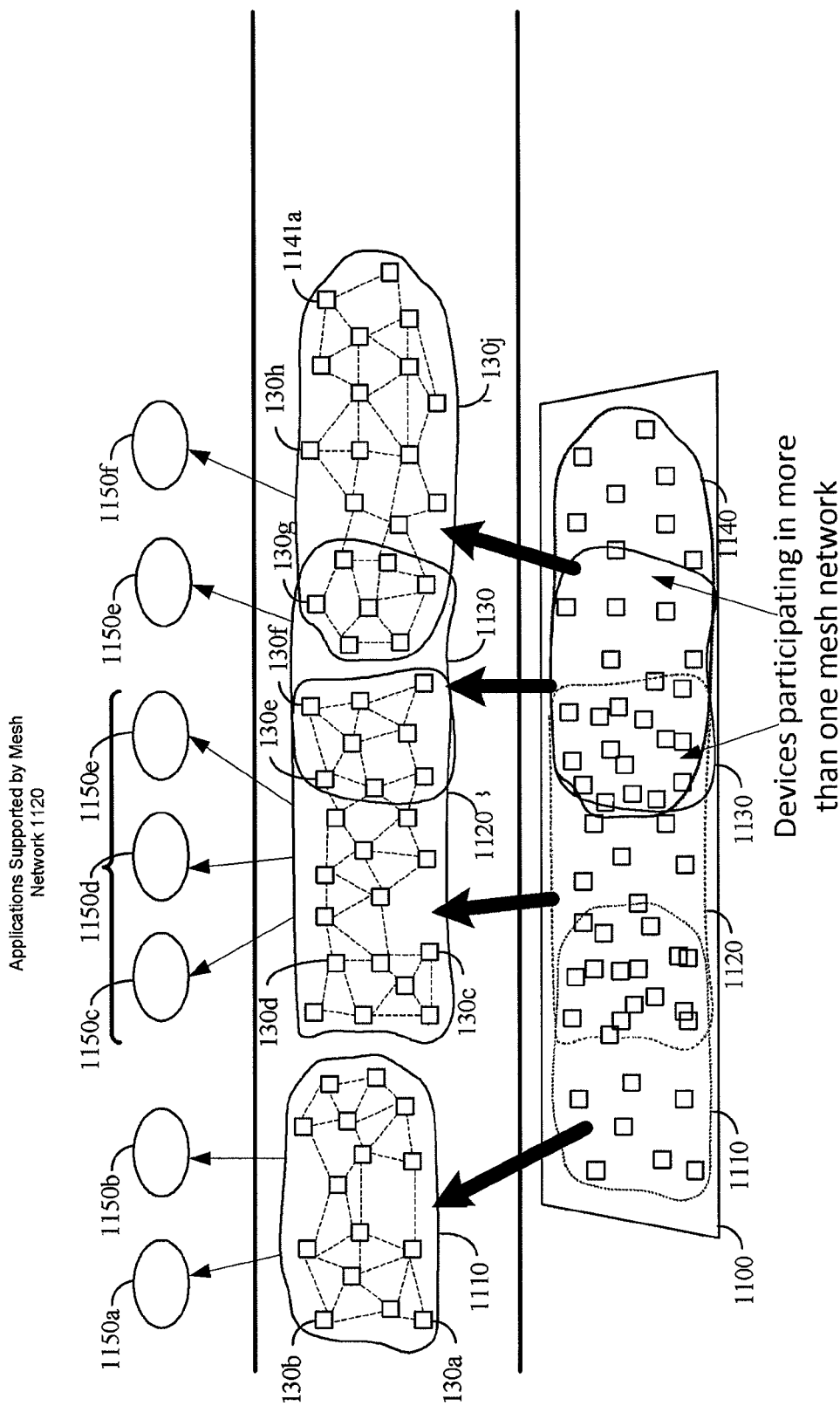

SYSTEMS AND METHODS FOR ESTABLISHING SYNCHRONIZATION ACROSS MULTIPLE NETWORKS AND PARTICIPATING STAS VIA OPERATIONS ON A KNOWN COMMON CHANNEL

CLAIM OF PRIORITY UNDER 35 U.S.C. §119

The present application for patent claims priority to Provisional Application No. 61/893,090 entitled "SYSTEMS AND METHODS FOR ESTABLISHING SYNCHRONIZATION ACROSS MULTIPLE NETWORKS AND PARTICIPATING STAs VIA OPERATIONS ON A KNOWN COMMON CHANNEL" filed Oct. 18, 2013, and assigned to the assignee hereof. Provisional Application No. 61/893,090 is hereby expressly incorporated by reference herein.

The present application for patent claims priority to Provisional Application No. 61/978,786 entitled "SYSTEMS AND METHODS FOR ESTABLISHING SYNCHRONIZATION ACROSS MULTIPLE NETWORKS AND PARTICIPATING STAs VIA OPERATIONS ON A KNOWN COMMON CHANNEL" filed Apr. 11, 2014, and assigned to the assignee hereof. Provisional Application No. 61/978,786 is hereby expressly incorporated by reference herein.

BACKGROUND

Field

The present application relates generally to wireless communications and more specifically to systems, methods, and devices for minimizing overhead and establishing synchronization across multiple networks and participating devices via operations on a known common network.

Description of the Related Art

In many telecommunication systems, communications networks exchange messages and data among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), neighbor aware network (NAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture forms an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed, wired networks.

One or more devices in a wireless network may be configured to provide services and applications. For example, a device may include hardware, such as a sensor, that captures data. An application running on the device may then use the captured data to perform an operation. In some cases, the captured data may be useful to other devices in the wireless network. Some other devices in the wireless network may include similar hardware so as to capture similar data. Alternatively, the device could provide these services (e.g., the captured data) to one or more other devices in the wireless network. The device may inform the one or more other devices in the wireless network of the services that the device provides by advertising this information over the wireless network. Other devices may further advertise the services provided by a device to other devices not within range or capable of direct communication with the service provider. However, communication of the aggregate of all available services, in combination with all necessary beaconing, messaging and computational overhead, may result in increased network loading and decreased data throughput availability given the required collision avoidance schemes implemented to avoid collisions of beacons and packets. Thus, improved systems, methods, and devices for communicating in a wireless network are desired.

SUMMARY

An embodiment of the disclosure may include a method for receiving timing information over a peer-to-peer network. The method comprises receiving first synchronization information comprising first timing information for synchronizing network communications on a first communication channel. The method further comprises receiving second synchronization information comprising second timing information for synchronizing communications on a second communication channel. The second synchronization information indicates a paging window interval communicated on the second communication channel. The paging window interval comprises a period during which at least one of beacons and data structures is communicated and is based on the first synchronization information. Receiving the paging window interval is non-concurrent and synchronized with the receiving of the first synchronization information.

Another embodiment of the disclosure includes a method for providing timing information over a peer-to-peer network. The method comprises receiving first synchronization information for synchronizing communications on the first communication channel. The method further comprises generating second synchronization information for synchronizing communications on a second communication channel. The second synchronization information indicates a first paging window interval communicated on the second communication channel. The first paging window interval comprises a time during which at least one of beacons and data structures is communicated on the second communication channel. The first paging window interval is based on the first synchronization information and is transmitted non-concurrently and synchronized with the first synchronization information. The method also comprises transmitting the second synchronization information to a peer device on the peer-to-peer network.

Another embodiment of the disclosure includes an apparatus for receiving timing information over an infrastructure-less network. The apparatus comprises a processor. The processor is configured to receive first synchronization information for synchronizing communications on a first communication channel. The processor is further configured to receive second synchronization information for synchronizing communications on a second communication channel. The second synchronization information indicates a paging window interval. The paging window interval comprises a period during which at least one of beacons and data structures is communicated on the second communication channel. The paging window interval is based at least in part on the first synchronization information, wherein the receipt of the paging window interval is non-concurrent and synchronized with the receipt of the first synchronization information. The processor is also configured to transmit communications on the first and second communication channels.

An additional embodiment of the disclosure includes an apparatus for transmitting timing information over an infrastructure-less network. The apparatus comprises a processor. The processor is configured to receive first synchronization information for synchronizing communications on the first communication channel. The processor is also configured to generate, for transmission, second synchronization information for synchronizing communications on a second communication channel. The second synchronization information indicates a paging window interval communicated on the second communication channel. The paging window interval comprises a time during which at least one of beacons and data structures is communicated on the second communication channel. The paging window interval is based at least in part on the first synchronization information, wherein the paging window interval is communicated non-concurrently and synchronized with the first synchronization information. The processor is further configured to transmit the second synchronization information to at least one peer device on the peer-to-peer network.

BRIEF DESCRIPTION OF THE DRAWINGS

FIG. 4A illustrates the paging windows and transmission windows of a single data delivery network in relation to each other and the discovery windows and discovery beacons of the NAN.

FIG. 4B illustrates the paging windows and transmission windows of multiple data delivery networks in relation to each other and the discovery windows and discovery beacons of the NAN.

FIG. 11 shows another possible organization of a neighbor aware network comprising a plurality of devices simultaneously participating in a plurality of data delivery networks.

DETAILED DESCRIPTION

Figure 1A:
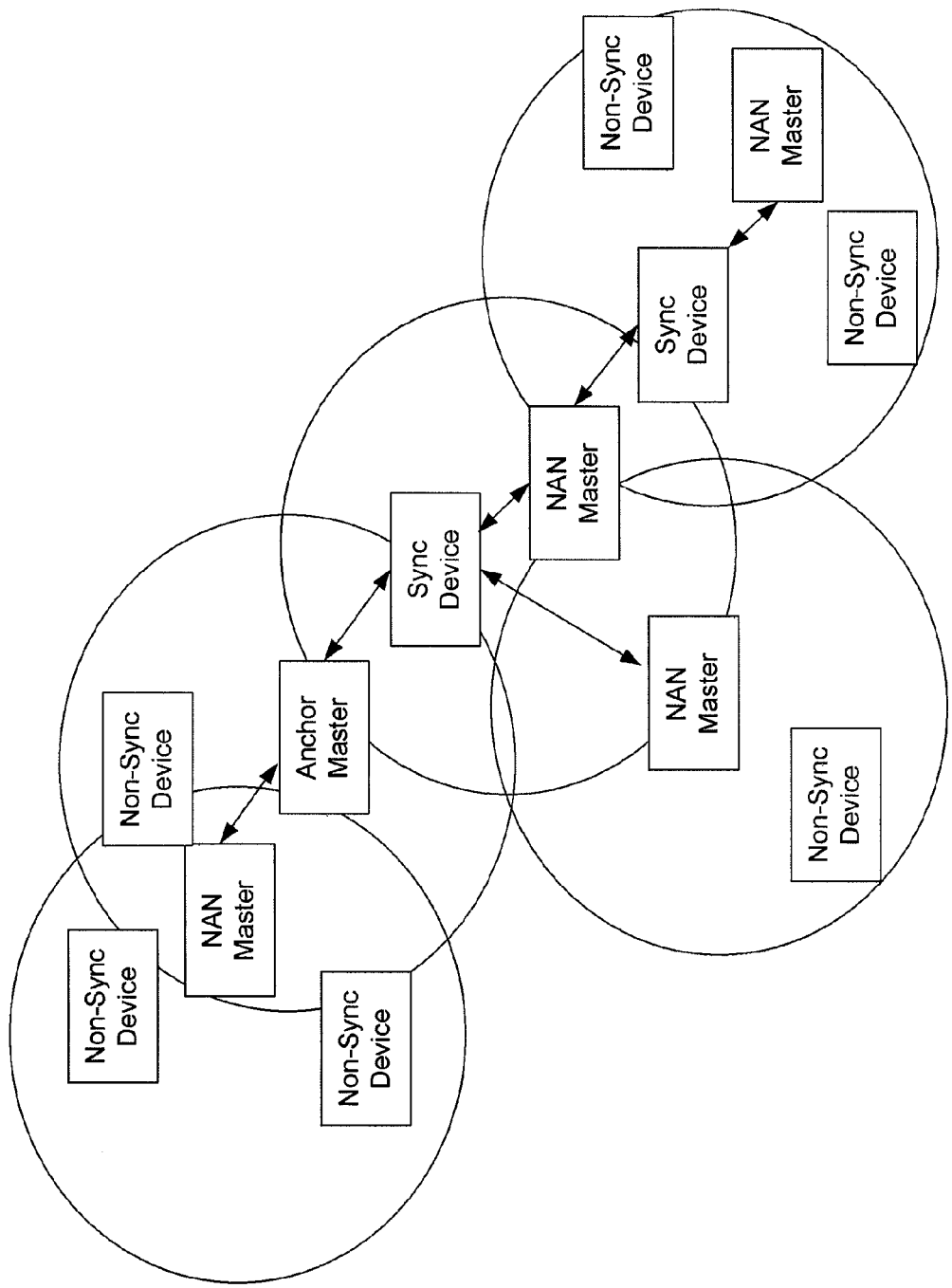
FIG. 1A shows one possible organization of a neighbor aware network.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure defined by the appended claims and equivalents thereof.

Popular wireless network technologies may include various types of wireless local area networks (WLANs). A WLAN may interconnect nearby devices together, employing widely used networking protocols. The various aspects described herein may apply to any communication standard, such as a wireless protocol.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure may be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting the scope of the disclosure being defined by the appended claims and equivalents thereof.

In some aspects, wireless signals in a sub-gigahertz band may be transmitted according to the 802.11ah protocol or the 802.11ac protocol using orthogonal frequency-division multiplexing (OFDM), direct-sequence spread spectrum (DSSS) communications, a combination of OFDM and DSSS communications, or other schemes. Implementations of the 802.11ah protocol or the 802.11ac protocol may be used for sensors, metering, and smart grid networks. Advantageously, aspects of certain devices implementing the 802.11ah protocol or the 802.11ac protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol such as 802.11s or 802.11ah or 802.11ai) compliant wireless link to obtain general connectivity to the Internet or to other wide area networks. In some implementations an STA may also be used as an AP.

An access point ("AP") may also comprise, be implemented as, or be known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard or the 802.11ac standard or the 802.11s standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. In some embodiments, the discussion below may be applicable to any type of data delivery network. The disclosure herein involves data delivery networks (i.e., data distribution networks), which may be used for information and data delivery. In some embodiments, the data delivery network may comprise a 1-hop or multi-hop mesh network.

The 802.11 standard defines how wireless devices may communicate via NAN and Social Wi-Fi mesh networks. The mesh networks may be used for static topologies and infrastructure-less networks. A NAN framework may only provide for 1-hop service discovery. Alternatively, the Social Wi-Fi mesh may extend the capabilities of devices participating in the NAN to perform multi-hop service discovery and establish data paths for content delivery between devices.

In some embodiments, the terminology used herein may be used interchangeably. As used herein, a NAN may refer to the Neighbor Awareness Networking Task Group in Wi-Fi Alliance networking task group or a physical grouping of wireless devices participating in a social Wi-Fi or mesh network, as discussed below. A NAN comprising multiple STAs may further implement the methods and systems disclosed herein. A NAN may further be referenced in terms of "Social Wi-Fi," referring to the social or peer-to-peer aspects of a "neighborhood." For example, the terms "Social Wi-Fi network" and "NAN" or "neighbor-aware-network" may be used interchangeably and the terms may have the same meaning. Additionally, the term "Social Wi-Fi Mesh" or "Social Wi-Fi Mesh network," which may be a network comprising a subset of devices of the Social Wi-Fi network, may also be referred to as "NAN data paths" or "data paths (DPs)." Each of the Social Wi-Fi Mesh networks may support one or more applications or services. Finally, the term "Mesh" or "Mesh STAs" or "Mesh group" may be interchangeably referred to as a "data path group." Accordingly, as used herein, the term "mesh network" may be interchanged with the term "data path network," and embodiments and descriptions below indicating "mesh networks" are not intended to be limited to only mesh networks, but also include any data path networks. These terms may refer to the subset of devices of a NAN cluster that shares a paging window (PW) communicated during a paging window interval (PWI) and may have common security credentials for the devices within the subset. As the paging windows may be communicated during the respective paging window intervals, discussion below including paging windows inherently includes discussion of the associated paging window interval for each paging window. The paging window interval (where discussed without reference to the paging window interval) may represent the time period during which the paging window is communicated, while the paging window may represent the data or information communicated during the paging window interval (e.g., beacons, etc.). In some embodiments, the devices of the data path group may be single-hop or multi-hop neighbors of each other. In some embodiments, the data path group may be restricted based on security credentials, and, accordingly, require out-of-band credentialing. It should be noted that while these concepts may be described in relation to mesh networks or neighborhood aware networks, other peer-to-peer networks or data delivery networks or data distribution networks may be used to implement the processes and principles disclosed herein.

Within the 802.11s standard, each participating device may be expected to beacon. The beaconing may help provide functionality such as aiding synchronization. Additionally, the beacons may also facilitate power saving by devices of the mesh by including traffic indicator maps (TIMs) for devices within the mesh. In a NAN framework, some devices (determined by certain properties, e.g., availability of power, accuracy of timing, etc.) may participate in the beaconing function to facilitate the propagation of a uniform sense of time across the multi-hop network. This uniform sense of time may contribute to synchronization, which may allow all the participating devices of the NAN and associated mesh networks to coordinate actions, such as sleep times, paging window intervals, and beaconing, allowing the mesh devices to operate more efficiently by saving power when not required to transmit or monitor for data and to more effectively utilize the network medium than when not synchronized.

To prevent beacon collisions between two neighboring mesh devices, 802.11s defines a mesh beacon collision avoidance (MBCA) architecture. To conform to the architecture, mesh devices offset their synchronization from neighbor meshes to avoid collisions. Adjustments to a target beacon transmit time (TBTT) are made when collisions are detected using various techniques and mechanisms. MCBA may also help ensure that each device, and each of its neighbors, have beacons that are distributed throughout the network in a given beacon period. Methods are also provided in the standard to avoid collisions between one (1)- and two (2)-hop neighbors of the 802.11s network.

The need to synchronize individual mesh networks following the 802.11s standard above may result in a large volume of beacon and synchronization traffic within the networks, especially those that includes a large number of devices. This large amount of beaconing and synchronization traffic may also result in large amounts of computational overhead for each device that is a member of the NAN and one or more meshes all to synchronize and avoid beacon collision between all neighbors. The quantity of beaconing and synchronization traffic and associated computational overhead suggest that in a crowded mesh network, a participating device may have little time for power saving when it may constantly need to wake-up to hear neighboring device beacons or provide its own beacons and perform other computational overhead.

To reduce the amount of overhead associated with synchronizing multiple mesh networks within a neighbor aware network (NAN), the methods, apparatus, and systems disclosed herein propose using the NAN channel to provide synchronization for members of all associated mesh networks and NAN. Under this approach, devices participating in mesh networks may not need to beacon on the mesh channels. Instead, device beaconing and synchronization may be performed on the NAN channel. The mesh networks may be synchronized based on synchronization information received on the NAN. The synchronization information may include beacons, timing offsets, channel information, network ID information, and other information providing for the synchronization of various network functions. The mesh networks may synchronize the timings of paging and transmission windows on each of the mesh networks such that devices participating in multiple mesh networks may monitor the paging windows for each mesh network in which it participates. In some embodiments, the paging windows may be communicated during the paging window intervals at the beginning of each transmission window. Other embodiments may communicate the paging windows during the paging window intervals at the end of the transmission window. The timing and periodicity of the paging and transmission windows and the paging window intervals may be synchronized via the beacons and other synchronization methods employed on the NAN.

FIG. 1A shows one possible organization of a neighbor aware network (NAN). As shown by FIG. 1a, a portion of devices on the NAN are selected as anchor or master wireless devices and provide beacons on a network allocated to the NAN. In some aspects, this network operates on channel six (6). Beaconing amongst the anchor or master devices is coordinated to reduce or prevent beacon collisions. The anchor or master devices are selected at least in part so that their beacons can be received by all wireless devices participating in the neighbor aware network.

Every NAN cluster may autonomously build a tree structure that may be anchored by a single NAN device that is called the Anchor Master. The timing of the Anchor Master may be propagated to all NAN devices through any Sync devices and any NAN Master devices. The priority and order of synchronization may be determined by a NAN device ranking scheme, giving each device a ranking. In determining a NAN device ranking for synchronization, each device may be assigned a Master Rank comprising at least one parameter. In some embodiments, two examples of parameters may be used to rank a NAN device for synchronization may be a Master Preference and a Random Value (e.g., Hash of the MAC address). The Master Preference parameter may be influenced by the power level at the device or other parameters such as the device clock accuracy. The Random Value may provide for some arbitration between devices having the same Master Preference value. The Random Value may change periodically to allow beacon transmission responsibilities to rotate among devices having the same Master Preference Value. The Hash of MAC Address may ensure that the Master Rank is unique and that no two devices have the same Master Rank.

In the methods, systems, and apparatus described herein, separate beaconing and synchronization may not be provided for mesh networks including devices participating on the neighbor aware network and any number of mesh networks. Instead, the synchronization information provided on the NAN may be used to synchronize communication on the mesh networks between participating wireless devices. Additionally, this synchronization information may also help coordinate sleep times of devices across all the various mesh networks.

The synchronization information from the NAN may include any information synchronize timing operations across all connected devices. The NAN synchronization mechanism may utilize a discovery window or may include discovery beaconing or other synchronization mechanisms. The participating devices listen for synchronization information from the NAN channel. In some aspects, the participating devices listen for the synchronization information during a discovery window of the NAN, and in some aspects, the listening is performed at a discovery beacon transmit time. This combination of the beacons and other synchronization mechanisms may help reduce the overhead faced on the mesh networks and channels, wherein all the overhead may be performed on the neighbor aware network as opposed to on the mesh networks themselves. When not listening for discovery window or discovery beacon on the NAN, the device may participate in data communications as part of a mesh network, and if not communicating on the mesh, the device may sleep.

Because the methods, systems, and apparatus described herein do not provide for separate beaconing and synchronization for each mesh network, a method is needed to indicate when buffered traffic may be available for a device that may have been asleep or non-responsive when the data was available on the neighbor aware network (NAN) or mesh network. Additionally, other information relevant to participation in the mesh network may also need to be communicated to the devices part of the mesh network. These parameters may be communicated or described during the mesh paging window intervals in paging windows, which will be described below.

To provide for the indications of buffered traffic, each mesh network maintained by the methods, systems, and apparatus disclosed herein is allocated a distinct paging window interval during which information relevant to the operation of the mesh network can be provided to devices participating in the mesh (e.g., the TIM bit mentioned above). These paging windows intervals and the paging windows communicated therein may also provide for coordination of sleep times between mesh network devices.

Figure 1B:
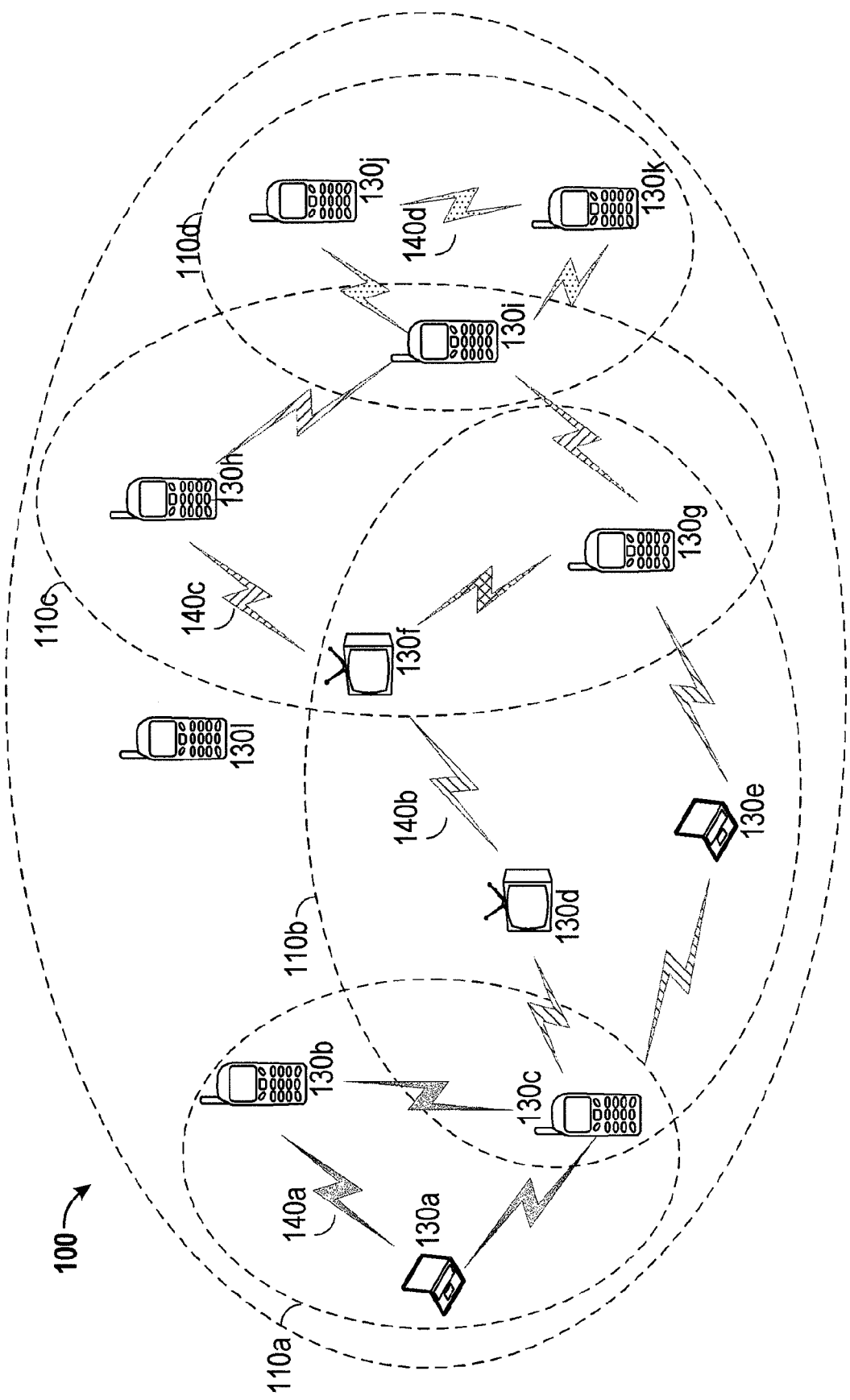
FIG. 1B shows an example of a neighbor aware network (wireless network).

Referring to FIG. 1b, a particular illustrative embodiment of a wireless NAN, with a plurality of devices 130a-130l and mesh networks 110a-110d, is depicted and generally designated 100. Wireless NAN 100 may comprise devices 130a-130l. Devices 130a-130l may also form groups of various sizes that communicate on social Wi-Fi mesh networks 110a-110d. A sampling of the communications paths between devices 130 on a mesh network 110 may be indicated by communication links 140.

A group of the devices 130 on the wireless NAN 100 may form a mesh network 110 to communicate data with other devices 130. A device 130 for the mesh network 110 may be determined or selected by any open choice manner. For example, the devices 130 may be selected according to their OS or their application or based on the type of device 130. In some embodiments, mesh membership may be determined based only on a choice to participate in or receive a service provided by the mesh network 110. In other embodiments, mesh membership may be determined by a service the device 130 wishes to provide. Further, the mesh 110 may consist of only devices 130 that consume or proxy one or more of the services provided by the mesh 110. As members of the mesh 110, devices 130 may proxy service discovery packets for all the services supported by the mesh; for example, the devices 130 may relay service discovery beacons and requests that are directed to or from other devices 130, essentially just forwarding information even if it does not involve that device specifically. Additionally, member devices 130 of the mesh networks 110 may forward data belonging to services supported by the mesh network 110 as necessary.

Mesh networks 110 may support any number of services and applications. In some applications, a mesh network 110 may support only one application on the mesh network 110, while in some other applications, a mesh network 110 may support two or more applications on the single mesh network 110. Similarly, the devices 130 participating in the wireless NAN 100 and the associated mesh networks 110 may participate in one or more applications or services. As will be discussed below, a device 130 may participate in more than one mesh network 110.

The devices 130 that are part of the wireless NAN 100 may have synchronized clocks and may wake up together periodically to participate in and monitor a discovery window. The communications within devices 130 of the wireless NAN 100 may operate on the same channel. The wireless NAN 100 may be identified by a "Cluster ID" identified in an A3 field of every NAN frame. In some embodiments, the device 130 initiating the wireless NAN 100 may pick the Cluster ID. In other embodiments, the Cluster ID may be assigned or determined by the framework or hardware of the wireless NAN 110. Transmission timing on the NAN channel may consist of multiple parts or elements. In one embodiment, there may be at least two parts: a discovery window and discovery beacons (not shown in this figure). In some embodiments, the discovery windows may comprise a periodically occurring short time window where all devices 130 in the wireless NAN 100 wake up to monitor the discovery window. During the discovery window, in some embodiments, discovery frames and synchronization beacons may be transmitted. The transmitted synchronization beacon may be used for TSF correction for existing devices 130 on the wireless NAN channel. The discovery beacons may be transmitted at intervals between the discovery windows. These discovery beacons may be used by devices 130 looking to find wireless NANs 100 that these devices 130 may join. In some embodiments, only a subset of devices 130 may transmit discovery beacons. In some other embodiments, only one device 130 of the wireless NAN 100 may transmit discovery beacons. In other embodiments, all the devices 130 of the wireless NAN 100 may transmit discovery beacons.

The wireless NAN 100 may communicate on a common Wi-Fi channel, e.g., channel 6. Communications, discovery windows, beacon synchronization, service discovery, and various other overhead communications associated with the wireless NAN 100 and the devices 130 associated with the wireless NAN 100 may occur on the NAN channel. Devices 130a-130l may each communicate on wireless NAN 100 on channel 6 (not shown). These communications may include the beaconing that each of devices 130a-130l uses to maintain synchronization in mesh networks 110a-110d. The synchronization may further assist in sleep synchronization between devices 130a-130l. Wireless network 100 includes a plurality of devices, including a first device 130a, a second device 130b, a third device 130c, and fourth device 130d, a fifth device 130e, a sixth device 130f, and seventh device 130g, an eight device 130h, a ninth device 130i, a tenth device 130j, an eleventh device 130k, and a twelfth device 130l. These twelve devices 130a-130l are "members" of the wireless NAN 100 as the noted devices are either actively or passively participating in communications on the wireless NAN 100. Each of these twelve devices 130a-130l may be participating in synchronization beaconing or a similar time synchronization mechanism, or additional communications on the wireless NAN 100. Communication links 140a-140d are depicted to represent an example of communications on the mesh networks 110a-110d between members of the mesh network 110. Communication links 140a may represent an embodiment of the communication path for mesh network 110a, while communication link 140b may represent an embodiment of the communication path for mesh network 110b. Communication links 140c and 140d may each represent an embodiment of the communication path for mesh networks 110c and 110d, respectively. In an embodiment, the communication links 140a-140d may take place on a separate channel from NAN channel and the communications for the NAN.

The communication structure for the mesh networks may conform to 802.11s standards or any alternate standard regarding communication structure. The mesh networks 110 may operate on channels where no beaconing takes place on the channels. Instead, devices 130 in these mesh networks 110 may maintain synchronization by monitoring the beaconing and synchronization mechanisms on the NAN channel (e.g., channel 6). The devices 130 on the mesh networks 110 may monitor the NAN channel during the discovery window to obtain synchronization information and then switch back to the mesh networks 110 of which they are members to continue data transfer and participation in the services offered by the mesh networks 110.

Devices 130a, 130b, and 130c are members of mesh network 110a. Devices 130c, 130d, 130e, 130f, and 130g are each members of mesh network 110b. Devices 130f, 130g, 130h, and 130i are each members of mesh network 110c. Devices 130i, 130j, and 130k are each members of mesh network 110d. Device 130l is also depicted; however device 130l is not depicted within any of mesh networks 110a-110d and is not associated or connected with and thus not a member of any mesh network and is solely communicating on the NAN channel. Mesh networks 110a-110d may communicate on shared channels, or alternatively, may each communicate on separate channels. In some embodiments, the mesh networks 110 may communicate on the same channel as the NAN communicates. Alternatively, the mesh network 110 may communicate on at least one channel distinct from that of the NAN. in operation, the wireless NAN 100 may be communicating on a standard channel (the wireless network channel), e.g., Channel 6, while the mesh networks 110a-110d may be communicating on different channels from the NAN. The present disclosure may refer to the use of devices 130a-130l in the context of a NAN or other wireless or mesh network. Likewise, such devices 130a-130l may alternatively be referred to as stations or "STAs" herein.

In at least one embodiment, one or more of the devices 130a-130l may be providing a particular service to an associated mesh network 110a-110d. For example, device 130a may be providing a service associated with music within mesh network 110a. Devices 130b and 130c are participating in the mesh network 110a receiving the data being provided by device 130a. Mesh network 110a may be operating on a channel distinct from that of the overhead communications of the wireless NAN 100.

In operation, one or more devices 130 may be the provider or service initiator of the service being offered on a mesh network 110. As a provider, a device 130 may be providing the service of a mesh network 110 and may be responsible for establishing the parameters necessary to enable other devices 130 to join the mesh network 110. The provider or initiator device 130 of the service on the mesh network 110 may remain in active communication or monitoring on the NAN channel. The provider device 110 may continue to advertise the provided service or respond to service requests received on the NAN channel that is used for general communications. Such continued advertising or responding to requests on the NAN channel allows new devices 130 on the NAN or current devices 130 on the NAN to join a mesh network 110 to gain access to the advertised service or application. For example, device 130a may advertise the service being provided on mesh network 110a to devices to other devices 130 of wireless network 100 on the NAN channel, or alternatively, may respond to service requests received on the NAN channel with response information indicating the parameters necessary for the new device 130 to join the mesh network 110a. The continued communication on the NAN channel allows devices that are not part of a mesh network to join a mesh network, such as device 130l, or allows devices that are members of another mesh network to join mesh network 110a. Similarly, each of mesh networks 110b-d have a provider who may advertise or respond to service requests on the NAN channel while providing the service on their associated mesh network to other devices. For example, device 130d may be the service provider for mesh network 110b, offering a service providing video games to devices 130c, 130e, 130f, and 130g on the mesh network 110b. Device 130h may be the service provider for mesh network 110c, which may be dedicated to a service sharing images or pictures to devices 130f, 130g, and 130i. Similarly, device 110j may be providing a mesh network 110d dedicated to videos to devices 130i and 130k.

A device may be a member of two or more mesh networks concurrently and may receive the services being provided by the service provider of the respective mesh networks. For example, device 130c may be a member of both mesh networks 110a and 110b. Thus, device 130c may be receiving the music services being provided by device 130a and image services being provided by device 130d concurrently. Similarly, devices 130f-g may be participating in mesh networks 110b and 110c, and device 130i may be a member of both mesh networks 110c and 110d.

In an embodiment, device 130l may be using a service locally that is being provided by one of the mesh networks 110a-d without being a member of any mesh network, e.g., device 130l could be watching a movie that is being shown on the video network but not be sharing the content of the mesh network.

In an embodiment, a device 130 providing a service on a mesh network 110 may be a consuming device 130 in another mesh network 110. For example, device 130c may be participating in mesh network 110a where a service for music is being provided by device 130a, while providing a video game service to devices 130d-130g.

In an embodiment, a single device 130 may be providing multiple services on multiple mesh networks 110. For example, device 130c may be providing a service for music on mesh network 110a to devices 130a-130b while also providing a service for video games on mesh network 110b to devices 130d-130g.

In operation, each of devices 130a-130l may continue to participate in the required operations of the wireless NAN 100, (e.g., beaconing and service discovery), while being a member of their respective social Wi-Fi mesh network(s) 110a-110d. The mesh networks 110a-110d are considered social Wi-Fi mesh networks because no synchronization beaconing or associated synchronization overhead may take place on these mesh networks 110. The devices may remain synchronized through their continued operations on the NAN channel. The devices participating in mesh networks 110a-d may switch to the NAN channel during the discovery window of the wireless NAN 100 and participate in the required time synchronization mechanism.

In an embodiment, the devices 130a-130l may also switch to the NAN channel during discovery beacons.

In an embodiment, the devices 130a-l may participate in multiple mesh networks 110. For example, device 130c may be a member of mesh network 110a and a member of mesh network 110b, where mesh network 110a provides a dedicated service for music and mesh network 110b provides a dedicate service for games. Alternatively, multiple mesh networks 110 may provide the same service to a device 130c, e.g., both mesh network 110a and 110b could be providing music services. Alternatively, mesh networks 110a-d may not be isolated to a particular service and could be mixed service mesh networks 110, where different data would be communicated, for example, but not limited to, music, video, games, or pictures.

In an embodiment, each mesh network could be established on different mesh channels.

Figure 2A:
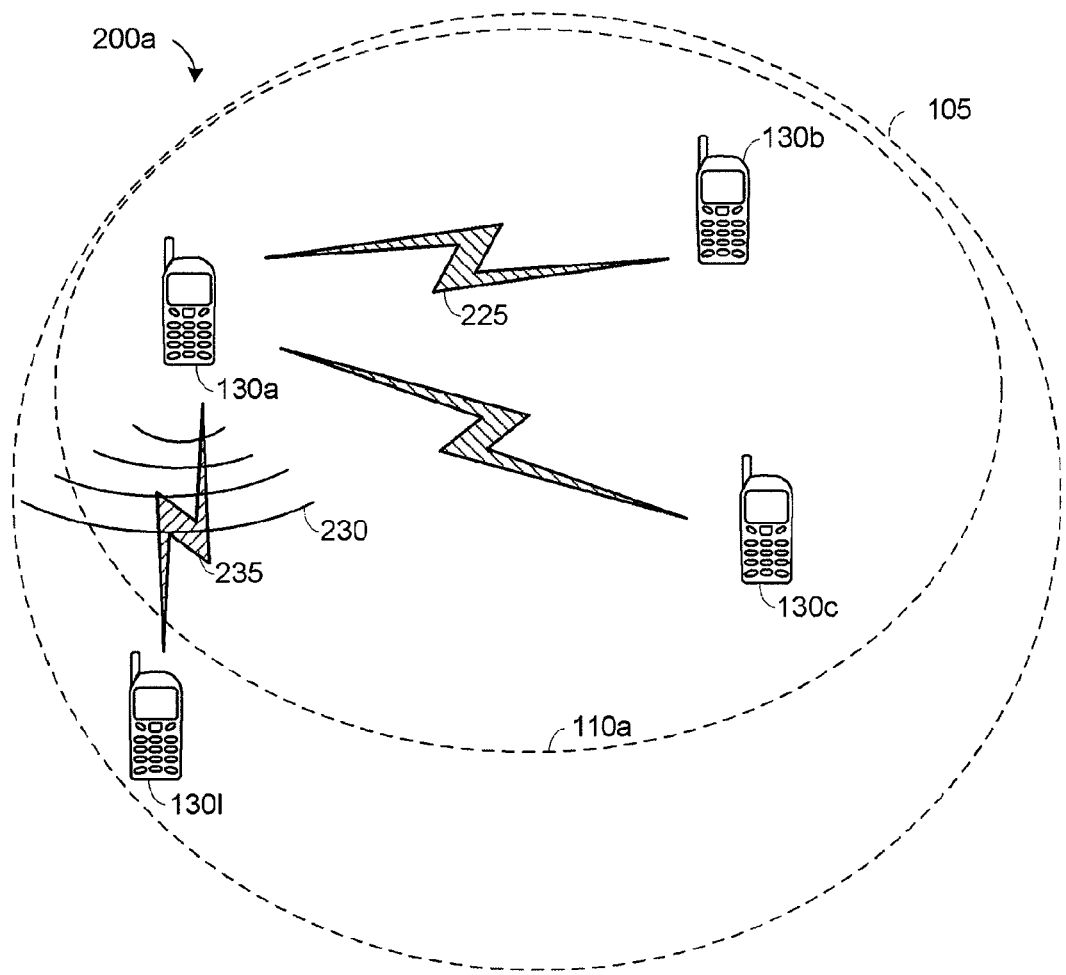
FIG. 2A shows an example of a data delivery network provider broadcasting service advertisements.

Referring to FIG. 2a, a particular illustrative embodiment of a NAN, a data delivery network, and devices is depicted and generally designated 200a. The device data delivery (for example, mesh network) network 110a includes a first device 130a, a second device 130b, and a third device 130c. These three devices may be "members" of mesh network 110a as the three noted devices are either actively or passively participating in the same service(s), using a service provided by another member device, or providing a service to another member device. A fourth device 130l is also depicted and is on the same wireless NAN 100 as the devices 130a-c; however device 130l is not within the mesh network 110a and not associated or connected with any of the services of mesh network 110a. Thus, fourth device 130l is not currently a member of the mesh network. The present disclosure may refer to the use of devices 130a, 130b, 130c, and 130l in the context of a NAN or other wireless network. Likewise, such devices 130a, 130b, 130c, and 130l may alternatively be referred to as devices, wireless devices, stations, or "STAs" herein. Communication links 225 represent established communication links between device 130a and devices 130b and 130c.

In at least one embodiment, one or more of the devices 130a, 130b, and 130c may be associated with a particular common device application/service on the mesh network 110. For example, each of the devices 130a, 130b, and 130c may be associated with a respective common device application, such as a social networking device application, a gaming device application, or a combination thereof, or may be sharing content, such as music, images, or videos, or a combination thereof. In some embodiments, device 130l may also be using the same application or viewing the same content, however according to FIG. 2a, device 130l is not a member device thus not using the application or sharing the content with the other depicted devices. In some other embodiments, it may be using different application or viewing different content.

In the embodiment depicted in FIG. 2a, the first device 130a may transmit a beacon or other broadcast transmission including a service advertisement 230 including information associated with a provided service on the NAN channel. In an embodiment, the service advertisement 230 may be a broadcast from a provider device (e.g., device 130a) indicating its capabilities/ability to provide a particular service ("provider station"). The device 130l may be a "seeker station," or a station that is looking for a particular service. In an embodiment, such a service may be a particular sensor (e.g., a GPS receiver) employed by the first device 130a, or other capabilities known in the art. The discovery request 235 may be sent by device 130l during a time interval associated with advertisement of the device mesh network 110a on the NAN channel, such as a discovery interval (or window). The service advertisement 230 and discovery request 235 may be a beacon in connection with wireless protocol such as an IEEE 802.11s protocol or other standard providing wireless connection.

In the particular example of FIG. 2a, the provider device 130a may receive the discovery request 235 from device 130l on the NAN channel. In response to receiving the discovery request 235, device 130a may use the information in the discovery request 235 to communicate with device 130l, sending a response (not shown) after the discovery interval and complete the required handshake to provide requested services to device 130l on the channel associated with the mesh network 110a.

The information device 130a would send to device 130l may include at least one of, but not limited to, the channel the mesh network is on, the paging window offset, the number of members, the mesh ID (name), a mesh key (utilized to identify multiple mesh networks with the same name), availability window, and additional information. The paging window offset (or start-time-offset) may be based upon the synchronization beaconing of the NAN channel and may represent the amount of time after the discovery window completes or begins. In an alternate embodiment, the paging window offset may be advertised during service advertising. By providing the paging window offset in combination with synchronization beaconing, any device joining the mesh network 110 may be able to remain synchronized with all other devices without having actual synchronizing overhead on the mesh network itself. In operation, provider device 130a may provide the information required to join the mesh network in the service advertisement or in a discovery response communication.

Figure 2B:
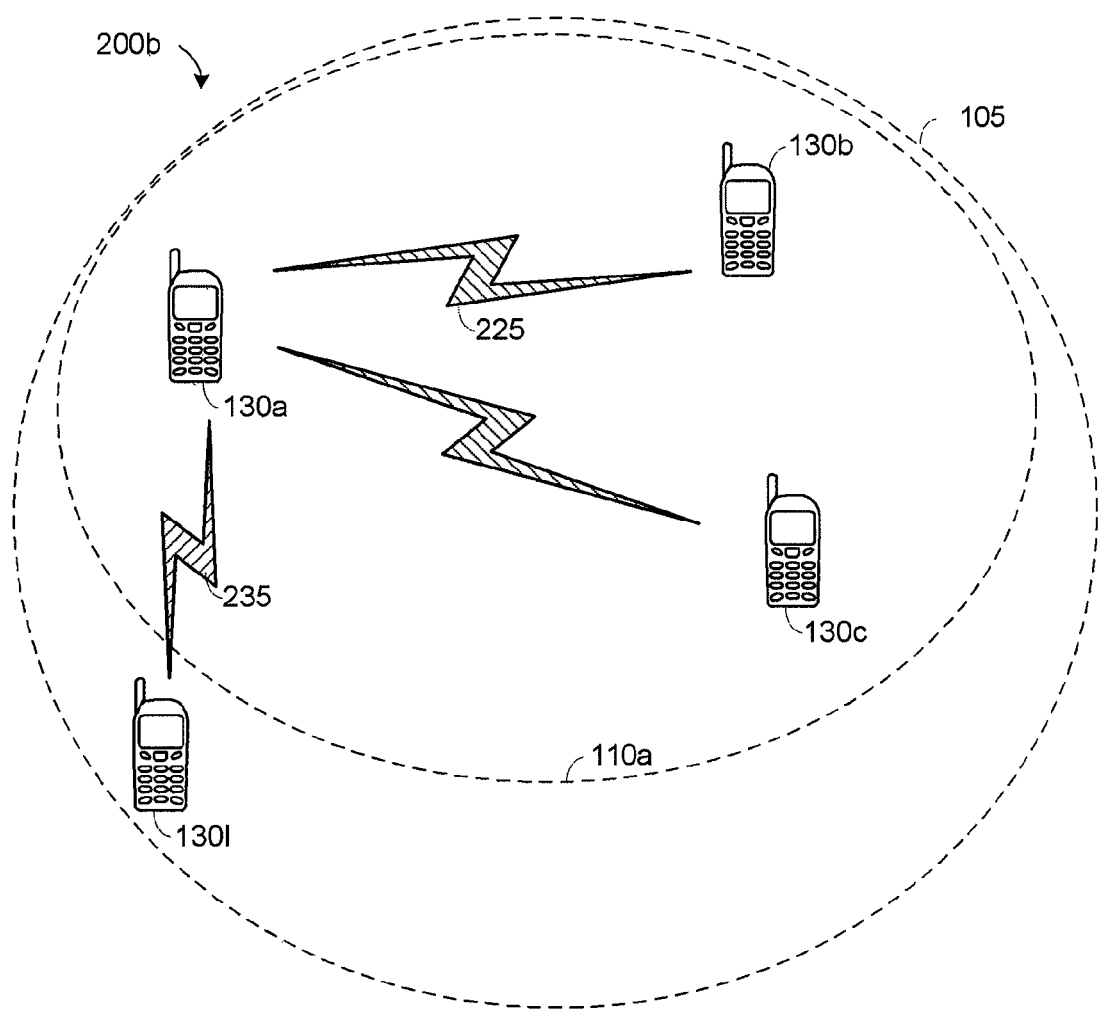
FIG. 2B shows an example of a data delivery network provider receiving discovery requests regarding the service provided.

Referring to FIG. 2b, a particular illustrative embodiment of a NAN 105, a device data delivery network 110a, and devices 130 and is depicted and generally designated 200b, similar as to that depicted in FIG. 2a. The device data delivery network (for example, mesh network) 110a includes a first device 130a, a second device 130b, and a third device 130c. These three devices 130a-130c may be "members" of a mesh network 110 as the three noted devices 130a-130c are either actively or passively participating in the same service(s), using a service provided by another member device, or providing a service to another member device. A fourth device 130l is also depicted and is on the same NAN channel as the devices 130a-130c, however device 130l is not within the mesh network 110a and not associated or connected with any of the services of mesh network 110a. Thus, fourth device 130l is not currently a member of the mesh network 110a. The present disclosure may refer to the use of devices 130a, 130b, 130c, and 130l in the context of a NAN or other wireless network. Likewise, such devices 130a, 130b, 130c, and 130l may alternatively be referred to as devices, stations or "STAs" herein.

In the embodiment depicted in FIG. 2B, the distinction from FIG. 2A is that the first device 130a may not transmit a beacon or other broadcast transmission including a service advertisement. In this embodiment, the provider station may not advertise its capabilities/ability to provide a particular service to devices on the NAN 105. Instead, the device 130l, the "seeker station," or a station that is looking for a particular service, may be broadcasting a discovery request on the NAN channel in search of a desired service. In an embodiment, such a service may be a particular sensor (e.g., a GPS receiver) employed by another device, or other capabilities known in the art. The discovery request 235 may be sent by device 130l during a time interval associated with discovery of the wireless network 100, such as a discovery interval or window. The discovery request 235 may be a beacon in connection with wireless protocol such as an IEEE 802.11s protocol or other standard providing wireless connection.

In the particular example of FIG. 2b, the provider device 130a may receive the discovery request 235 from device 130l. In response to receiving the discovery request 235, device 130a may use the information in the discovery request 235 to communicate with device 130l, sending a response (not shown) after the discovery interval and complete the required handshake to provide requested services to device 130l.

The information device 130a would send to device 130l may include at least one of, but not limited to, the channel the mesh network is on, the paging window offset, the number of members, etc. The paging window offset may be based upon the synchronization beaconing of the NAN channel. By providing the paging window offset in combination with synchronization beaconing, any device joining the mesh network 110a may be able to remain synchronized with all other devices without have actual synchronizing overhead on the mesh network 110a itself. In operation, provider device 130a may provide the information required to join the mesh network in a service advertisement or in a discovery response communication occurring on the NAN.

Figure 2C:
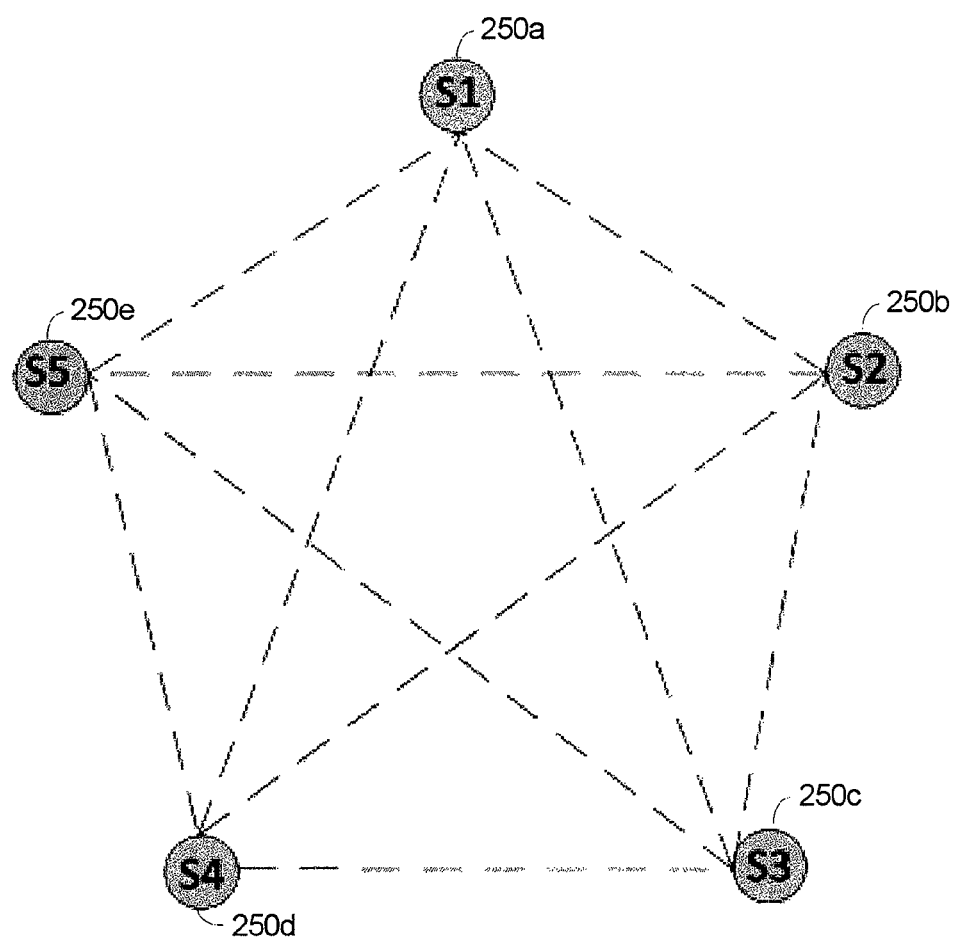
FIG. 2C shows an example of many-to-many connectivity between a plurality of data delivery networks.

Referring to FIG. 2C, an exemplary network diagram shows connectivity between a plurality of data delivery networks. In an embodiment, each of the nodes 250a-250e may represent one or more devices 130 as described above and as depicted as communicating with multiple other nodes 250. In some embodiments, each of the nodes 250 may represent a data delivery network (for example, a mesh network) comprising devices 130 that are capable of transmitting to multiple other devices 130 of various mesh networks 110. For example, node 250a may represent mesh network 110a (and, accordingly, the devices 130a, 130b, and 130c) that may be transmitting data to nodes 250b, 250e, and 250d (representing one or more of other mesh networks 110 and/or the devices 130 which they include. For example, node 250a may represent device 130a and 130b of mesh network 110a that are both transmitting information to one or more devices 130c, 130d, 130e, 130f, and 130g of mesh network 110b. Node 250a may represent device 130a of mesh network 110a, which may transmit information to one or more of device 130b of mesh network 110a, device 130c of mesh network 110b, device 130h of mesh network 110c, and device 130j of mesh network 110d.

Figure 3:
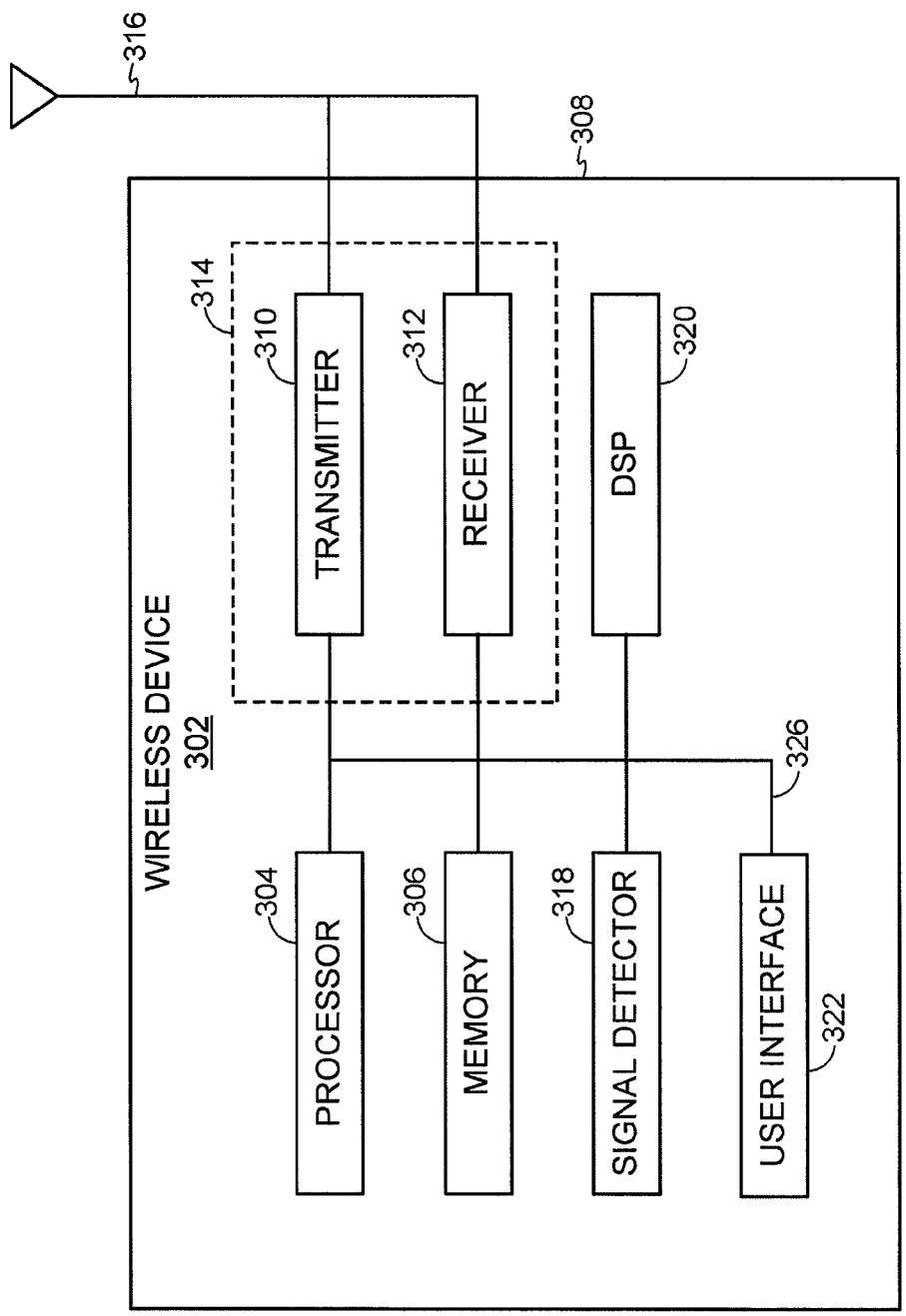
FIG. 3 illustrates an embodiment of a wireless device of one or more of the devices of FIG. 1b.

Referring to FIG. 3, an exemplary functional block diagram of a wireless device 302 that may be employed within the communication system of FIG. 1B is shown. The wireless device 302 is an example of a device configured to implement the various methods described herein. For example, the wireless device 302 may comprise one of the device 130a-l.

The wireless device 302 may include a processor 304 which controls operation of the wireless device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable, gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and/or a receiver 312 to allow transmission and reception of data between the wireless device 302 and a remote location. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. The DSP 320 may be configured to generate a packet for transmission. In some aspects, the packet may comprise a physical layer data unit (PPDU).

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

The various components of the wireless device 302 may be coupled together by a bus system 326. The bus system 326 may include a data bus, for example, as well as a power bus, a control signal bus, and a status signal bus in addition to the data bus. Those of skill in the art may appreciate the components of the wireless device 302 may be coupled together or accept or provide inputs to each other using some other mechanism.

Although a number of separate components are illustrated in FIG. 3, those of skill in the art may recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

The wireless device 302 may comprise a device 130a-l, and may be used to transmit and/or receive communications. That is, devices 130a-l may serve as transmitter or receiver devices. Certain aspects contemplate signal detector 318 being used by software running on memory 306 and processor 304 to detect the presence of a transmitter or receiver.

As described above, a wireless device, such as wireless device 302, may be configured to provide services within a wireless communication system, such as the device mesh network 110a. For example, the wireless device 302, such as devices 130a-c and 130l, may include hardware (e.g., a sensor, a global positioning system (GPS), etc.) that is used to capture or calculate data (e.g., sensor measurements, location coordinates, etc.). An application running on a device 130a-c and 130l may then use the captured or calculated data to perform an operation. In some cases, the captured or calculated data may be useful to other devices in the device mesh network 110a. The devices 130a-c and 130l could include similar hardware so as to capture or calculate similar data. For example, device 130a could provide these services (e.g., the captured or calculated data) to the other devices 130*b* and 130*c*. The device 130*a* may inform the other devices 130*b*, 130*c*, and 130*l* of the services that the device 130*a* provides by advertising this information over the NAN through service discovery announcement broadcasts or similar advertisements. Likewise, the devices 130*b*, 130*c*, and 130*l* may also advertise the services that they provide outside the device mesh network 110*a*. In this way, a given device 130*b* and 130*c* in the device mesh network 110*a* may already be aware of services available in the device mesh network 110*a* and avoid performing duplicative operations. Such a wireless communication system may be referred to as a neighbor aware network (NAN). As described herein, "service announcements" may also be referred to as "service advertisements," relating to the same concept of a given provider device informing other wireless devices of available services.

Referring to FIG. 4A, an exemplary timing scheme for discovery windows on a wireless NAN 100 and paging and transmission windows, 410 and 411, respectively, on a data delivery network 110*a* is depicted and generally designated 400. When participating on a data delivery network (for example, a mesh network) 110 on which device 130 may not beacon according to the structure defined above. Accordingly, the device 130 needs an alternate mechanism to indicate traffic to sleeping neighbor devices and be informed of awaiting traffic. Accordingly, the mesh network 110 may be structured such that a small paging window 410 is communicated on the mesh network 110 channel at the beginning of each transmission window 411 during a paging window interval. This paging window 410 may be used to communicate various non-synchronization information on the mesh network 110, e.g., that device 130 has traffic to send to another device 130 on the mesh network 110. All devices 130 participating in on the mesh network 110 may wake up during the paging window interval to receive the paging window 410. The devices 13Q may listen for any indicators that there is traffic to be sent to them or to send any traffic indicators to other devices 130 or to send/receive any of the other information that may be communicated in the paging window 410 during the associated paging window interval.

In some embodiments, the paging windows 410 and the traffic windows 411 on the mesh network 110 may be sent on a more periodic basis than the discovery windows 405 being broadcast on the wireless NAN 100. In some other embodiments, the paging windows 410 and the traffic windows 411 may be communicated as often or less often as the discovery windows 405 on the wireless NAN 100. During the paging window intervals during which the paging windows 410 are communicated, all devices 130 associated with the mesh network 110 may be expected to be awake to receive, process, and or transmit indicators and additional information messages. For example, routing messages, authentication and association message, or group key announcement and procurement messages may be communicated during the paging window interval. In some embodiments, the routing messages may comprise a path request (PREQ) message, a path reply (PREP) message, or Root Announcement (RANN) messages, among others. The authentication and association message may pertain to the step involved when device 130 joins the mesh network 110, while the group key messages may be associated with-announcing a new group key and procuring the new key from the device that generated it. For example, a group key for a mesh network 110 may function as a security key, such that only devices 130 knowing the key will be able to participate in communications on the mesh network 110. This may help create a more secure mesh network 110 as devices 130 continuously leave and join the mesh network 110. The group key may be periodically changed. In some embodiments, the group key may be changed based on an algorithm. In some embodiments, any device of the mesh network 110 may initiate a change of the group key using the algorithm. In 802.11s, each host device had its own group key with its neighbors, and anytime a neighbor left, all neighbors had to change their group keys with the host device. The group key messages described herein allows a single group key to be centralized in use with the entire mesh network, allowing the devices 130 to operate more efficiently by spending fewer resources dealing with the group key.

As discussed above, in some embodiments, a device 130 may be a member of more than one mesh network 110. In such situations, the various mesh networks may have to coordinate their paging and transmission windows 410 and 411, respectively. Accordingly, each mesh network 110 may have a transmission window 411 such that each mesh network 110 has an opportunity to transmit between discovery windows 405 of the wireless NAN 100. The transmission window 411 may be coordinated using a start-time offset parameter that, in some embodiments, may be communicated during the discovery windows 405 of the wireless NAN 100. In some other embodiments, the start-time offset parameter may be communicated during the paging window interval within the paging window 410 of individual mesh networks 110.

Referring to FIG. 4B, an exemplary timing scheme for discovery windows, paging windows, and transmission windows is shown and generally designated 400. The paging window intervals are intended to embody the same time periods as the paging windows in FIG. 4B. This embodiment shows a wireless NAN 100 with three mesh network channels 110*a*, 110*b*, and 110*c*. Each of mesh networks 110*a*, 110*b*, and 110*c* has distinct paging windows 410, 415, and 420, respectively, paging window intervals, and distinct transmission windows 411, 416, and 421. A paging window 410 exists to allow messaging or beaconing of a sort to occur within a network. Various beacons or data structures may be transmitted in the paging window 410 during a paging window interval to allow devices within a mesh network 110 to communicate with each other. For example, a TIM (traffic indicator map) data structure may be communicated in the paging window to allow devices 130 to indicate buffered traffic for another device 130. As discussed above, the paging window may also comprise routing messages, authentication and association message, and group key announcement and exchange messages, among others.

As shown, paging windows 410, 415, and 420, their respective paging window intervals, and transmission windows 411, 416, and 421 may never overlap. They each start at different times to accommodate any devices 130 that are part of more than one mesh network 110. Thus, a device 130 that is part of both mesh network 110*a* and 110*c* would listen to each mesh network 110 for the respective paging window 410. During the paging window interval of a mesh network 110, all member devices 130 on the mesh network 110 may be awake to either send or listen for TIM bits. During the transmission windows of a mesh network 110, only the devices 130 with information to transmit or receive may be awake in order to complete the associated operation. The paging windows 410, 415, and 420, paging window intervals, and the transmission windows 411, 416, and 421 are synchronized based on the discovery window 405 of the NAN 100, each being offset a specific amount. Therefore, the data transfers occurring on each of the mesh networks are synchronized via the beaconing (or similar) synchronization mechanism occurring on the wireless NAN 100.

In operation of the mesh networks 110a, 110b, and 110c and wireless NAN 100, the devices 130 participating in the mesh networks 110 are allowed to enter a "sleep" or "standby" mode, wherein the devices 130 may enter a low power mode while refraining from participating in active communications on the specific mesh network 110 on which they are "sleeping." A "sleep" or "standby" mode is characterized by allowing a sleeping device 130 to not participate in active communications on the mesh network 110 while allowing the device to wake up to listen during discovery windows 405 on the wireless NAN 100 and paging windows 410 on any mesh network 110 to which the device 130 belongs. All devices 130 on the wireless NAN 100 may be expected to wake up during discovery windows 405 to exchange any message that aids service discovery or provision to any device 130. Once awake, devices with information to receive or transmit will remain awake to complete their operations. As shown by FIG. 4, the paging windows (within the paging window intervals) and the transmission windows of the mesh networks 110 may follow immediately after the discovery window 405 on the wireless NAN 100 but offset from the discovery window 405. The discovery window 405 is separated by a fixed time interval 455, and repeats periodically based on fixed time interval 455.

In at least one embodiment, devices 130 participating in any mesh network 110a, 110b, or 110c may not be allowed to go to "deep sleep." All devices participating in a mesh network may only go to "light sleep." These devices wake up to listen to each beacon. A "deep sleep" may be characterized by allowing a device to sleep through the paging and discovery windows.

In operation, while a device is in the sleep or standby mode, neighbor devices 130 may buffer traffic for the sleeping device 130. These neighbor devices 130 may indicate the presence of buffered traffic by setting the appropriate TIM (traffic indicator map) bits. The TIM bits may be communicated in the paging window during the paging window interval for each mesh network 110. In some embodiments, the TIM bits are communicated in the NAN paging window (paging window on the NAN channel), and the TIM bits may be aggregate TIM bits comprising information for multiple devices communicating on mesh networks. The devices 130 belonging to any of the multiple mesh networks may receive the TIM bits indicating traffic for the devices 130 from the aggregate TIM bit, as described below. In some embodiments, where the paging window is specific to a particular mesh, the TIM bits may indicate traffic corresponding to devices 130 that are members of that specific mesh. The TIM bit is a data structure where each device 130 on the mesh network 110 is represented by a bit. In some other embodiments, bit 0 of TIM may be reserved to indicate broadcast traffic. When a device 130 is sleeping and a neighbor has buffered data for that device 130, the neighbor device 130 sets the bit in the TIM data structure to indicate to the device 130 that buffered data for the device 130 exists. When the sleeping device 130 wakes up for the discovery and paging windows, the device 130 is alerted to the existence of buffered traffic when it exams the TIM data structure in the paging window and realizes the bit for buffered date has been set by a neighbor device 130. The device 130 may communicate with the device 130 buffering the traffic to have it broadcasted to the destination device 130. Therefore, as mentioned above, the paging windows, the paging window intervals, and transmission windows for the various mesh networks 110 may not overlap so that a device 130 that is a member of multiple mesh network 110 can be alerted to any buffered traffic being held for it on any mesh network 110 of which it is a member and receive that buffered traffic. If the paging windows, a paging window interval, or transmission windows overlapped, a device 130 may miss the paging window or transmission windows for a mesh network 110 it belongs to and not realize there is buffered data waiting for transmission or not receive the buffered data.

In an embodiment, the fixed time intervals 455 between discovery windows 405 on the wireless NAN 100 may be greater than the interval between the discovery beacons 430 and paging windows 410, 415, and 420, the paging windows interval, and transmission windows 411, 416, and 421 on the mesh network 10a, 110b, and 110c. The discovery windows 405 on wireless NAN 100 contains the discovery frames identifying services offered by devices 130 in the NAN 100 and synchronization beacons to establish time synchronization in all devices on the wireless NAN 100.

In some aspects, the time between discovery windows 405 may be divided into a number of substantially evenly spaced paging time periods. For example, if the discovery windows 405 are 500 ms apart, this discovery window time period may first be divided into five paging time periods of 100 ms each. Alternatively, the discovery window time period may be divided into two paging time periods of 250 ms each. A paging window offset may then indicate when a paging window is communicated within each paging window interval in relation to the discovery windows 405 or the discover beacon. For example, if there are five paging time periods between each discovery window 405 and the discovery beacon, a paging window offset of 5 ms may provide paging window intervals at 5 ms, 105 ms, 205, 305, 405 ms after the start of the discovery window 405 or the discovery beacon in one aspect.

In various aspects, the duration of a paging window interval may be statically defined or dynamic based on a number of mesh networks 110 operating with the wireless NAN 100. When a duration of the paging window interval is statically defined, the number of paging window intervals within each discovery window interval may vary. For example, a wireless NAN 100 supporting a small number of mesh networks 110 may provide more separate paging window intervals in each discovery window interval than a wireless NAN 100 supporting a larger number of mesh networks 110, because fewer mesh networks 110 means less sharing of the available time between discovery beacons and discovery windows.

Other aspects may dynamically vary the duration of a paging window interval based on the number of mesh networks currently supported. For example, a wireless NAN 100 supporting a small number of mesh networks 110 may provide for paging windows, paging window intervals and transmission windows of a longer duration than a wireless NAN 100 supporting a larger number of mesh networks 110.

Paging windows 410, 415, and 420, paging window intervals, and transmission windows 411, 416, and 421 are offset from the discovery window 405 and discovery beacons and are non-concurrent. In the beacon contained in the paging window for the mesh network, the device 130 may notice the TIM bit indicating buffered data for it has been set. The device 130 may need to remain awake for all paging window intervals to receive paging windows associated with mesh networks to which the device belongs, such as paging windows 410 and 420. The paging window intervals for which a given device wakes up may not be consecutive. Thus, the time synchronization beacons contained in the discovery windows 405 are essential to maintaining synchronization across all mesh networks, as this may provide the basis for the paging window interval offsets, which devices would need to know when wake up at the appropriate times.

Figure 4C:
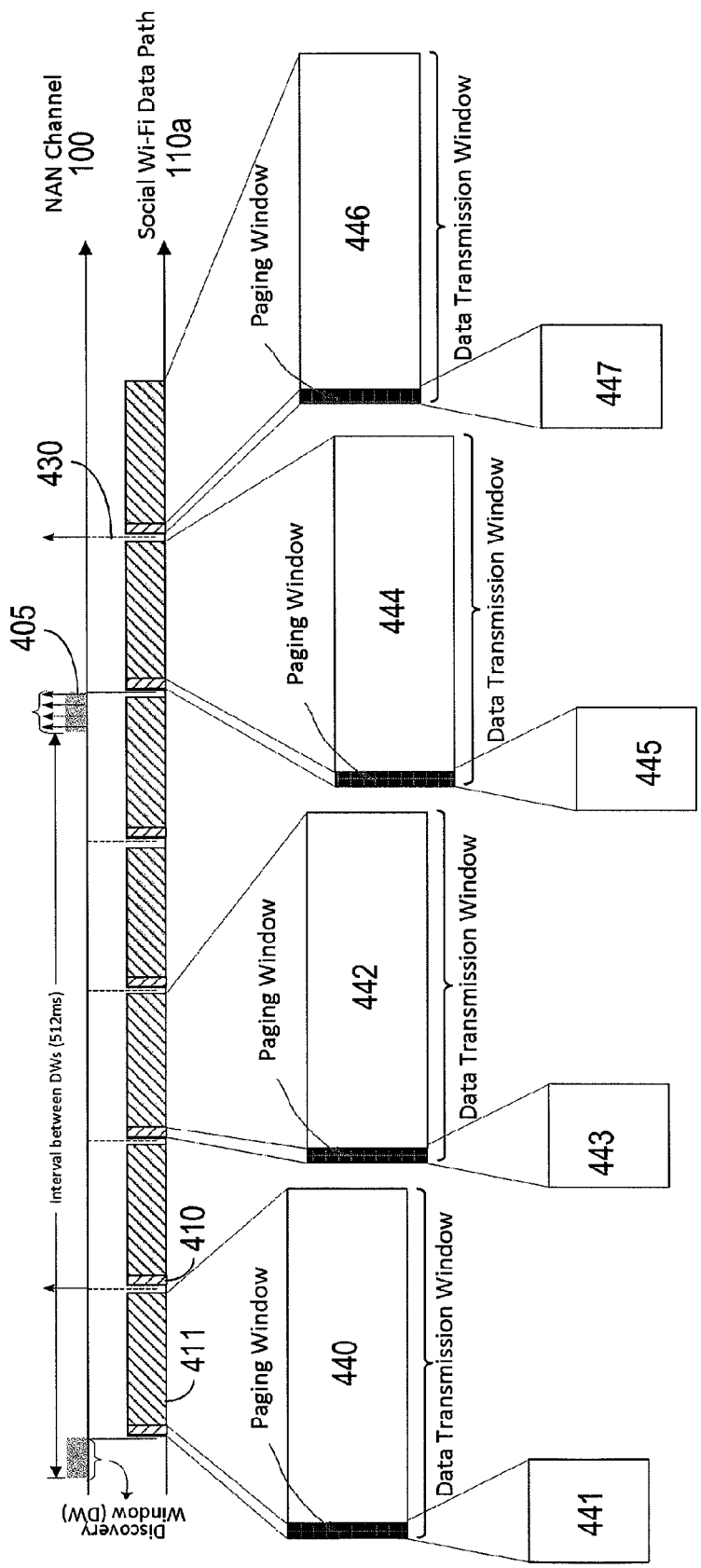
FIG. 4C represents a sequence of discovery windows and discovery beacons on a NAN network and transmission and paging windows on data delivery networks in accordance with an exemplary embodiment.

FIG. 4C represents a sequence of discovery windows 405 and discovery beacons 430 on a NAN channel (i.e., NAN network) 100 and transmission and paging windows on a data delivery network (for example, mesh network) 110a. As described above, in some embodiments, the NAN and the mesh may operate on the same channel, and the paging windows may be communicated on the NAN channel or the combined NAN and mesh channel. In the embodiment depicted, there are five paging windows and transmission windows between subsequent discovery windows 405. As depicted, the discovery beacons 430 occur at periodic intervals between the discovery windows such that there are, for example, 4 discovery beacons 430 between the discovery windows 405. The TIM bits may be communicated at a lowest available data rate so that they may be reliably received by all devices 130 on the mesh network. Additionally, the TIM bits may set the Network Allocation Vector (NAV) for the remaining transmission window so that other devices 130 on the mesh network are aware how long the medium will be in use for the transmission indicated by the TIM bit. The NAV may operate as a timer that counts down to zero from a set value at a uniform rate, where zero may indicate that the network medium is idle or available for use. This mechanism may be implemented where devices 130 coordinate access to the network medium via virtual carrier-sensing as opposed to physical carrier-sensing, where the devices 130 check and find the medium busy when they need to access it. Virtual carrier-sensing may conserve energy in comparison to physical carrier-sensing.

In the embodiment depicted in FIG. 4C, paging window 441 may indicate that a source of broadcast traffic intends to transmit and sets the TIM bits of all devices 130 (not shown here) to "1" to indicate that each device 130 has traffic to be transmitted to it. Additionally, an additional source may indicate unicast traffic by setting the TIM bits associated with the recipients of the unicast traffic to "1" to indicate waiting traffic. Accordingly, during the transmission window 440, since the broadcast source set the TIM bits of all devices 130 to "1", all the devices of the mesh network 110a may remain awake to receive the broadcast traffic. Additionally, during this transmission window 440, the unicast source will also transmit its traffic to the devices 130 that have their TIM bit set by the unicast source.

The third paging window 443 may indicate that a no source of traffic intends to transmit and thus none of the TIM bits of any device 130 is set to "1". Accordingly, during the associated transmission window 442, since each of the TIM bits of each of the devices 130 are "0", each of the devices of the mesh network 110a may go to sleep. The sixth paging window 445 may indicate that a source of broadcast traffic intends to transmit and sets the TIM bits of all devices 130 (not shown here) to "1" to indicate that each device 130 has traffic to be transmitted to it. Accordingly, during the associated transmission window 444, since the broadcast source set the TIM bits of all devices 130 to "1", all the devices of the mesh network 110a may remain awake to receive the broadcast traffic. During the seventh paging window 447, the paging window 447 may indicate that two sources may indicate unicast traffic by setting the TIM bits associated with their respective recipients of the unicast traffic to "1" to indicate waiting traffic. Accordingly, during the transmission window 446, the unicast sources will also transmit their traffic to the devices 130 that have their TIM bit set by the unicast sources. Each device 130 may switch to power save mode during a transmission window 411 if it does not have unicast or broadcast traffic to send or receive, as indicated during the corresponding paging window 410.

Figure 4D:
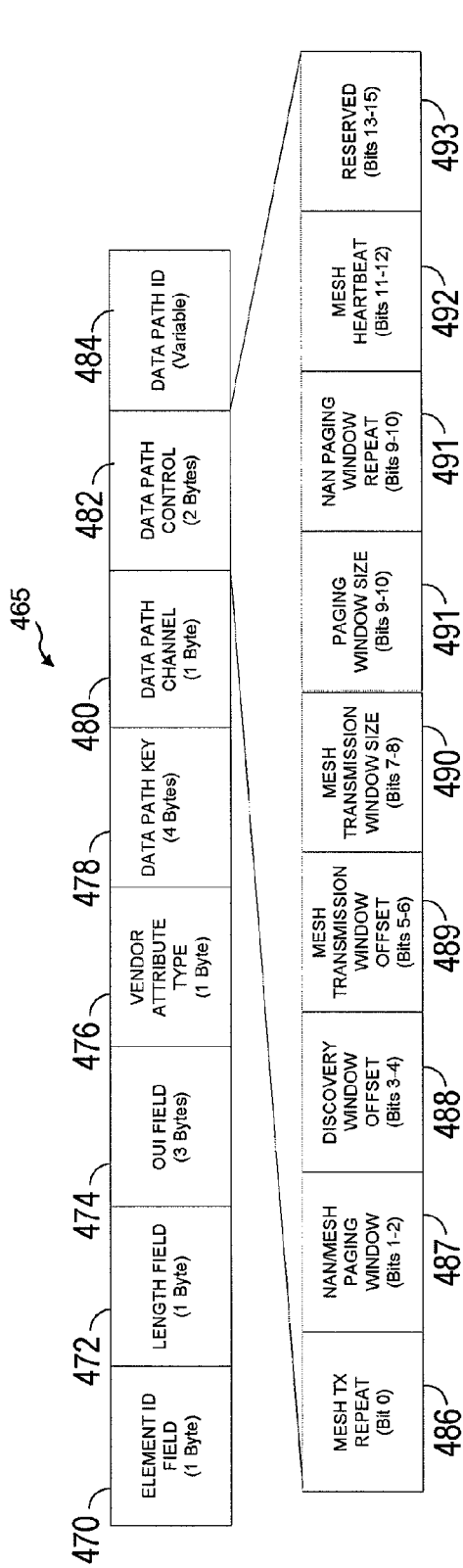
FIG. 4D shows a message frame that may be used for communicating data delivery network attributes.

FIG. 4D shows a message frame that may be used for communicating data delivery network attributes. This message frame may be communicated during the discovery window on the NAN and may be intended to provide necessary information regarding the synchronization of the paging windows, paging window intervals, and transmission windows of the mesh network 110. In one example, information element (IE) may be used to communicate mesh attributes. Specifically, FIG. 4D shows an embodiment of a NAN information element (IE) 465 for communicating data path (DP) attributes to a wireless device that may be interested in joining the mesh network 110. Those skilled in the art will appreciate that the NAN IE 465 may have more or fewer components than illustrated in FIG. 4D. As shown, the NAN IE 465 includes a sampling of components useful for describing some prominent features of implementations within the scope of the claims and may include one or more additional fields that are not shown or may include one or more fields that may not be utilized in all embodiments. The NAN IE 465 may include element ID field 470, which may be 1 byte in length for example, and may include an integer value identifying the specific NAN IE or NAN IE type. The NAN IE 465 may further include a length field 472, which may also be 1 byte in length, and which may include an integer value indicating length, in octets, of the following fields in the NAN IE 465. The value of the NAN IE 465 depicted, for example, may be 4 plus the total length of the data path attributes. The NAN IE may further include an Organizationally Unique Identifier (OUI) field 474, which may be 3 bytes in length, and may include an integer value representing a Wi-Fi Alliance (WFA) or vendor specific OUI. The NAN IE 465 may further include a Vendor Attribute Type field 476, which may be 1 byte in length, and may include a value identifying the following attributes as being data path attributes. The NAN IE 465 may further include a data path key field 478, which may be 4-bytes in length and may be used to distinguish between two mesh networks which may have the same Mesh ID. In some embodiments, this may be a hash of the current mesh group key. The NAN IE 465 may further include a data path channel field 480, which may be 1-byte in length with a variable value intended to indicate the channel on which the mesh network is operating. The NAN IE 465 may further include a data path control field 482, which may be 2-bytes in length with a variable value. The individual bits within the data path control field 482 may represent specific information. For example, Bit 0 486 may represent the Mesh Transmission Repeat and indicate if the mesh transmission window is periodically repeated multiple times between consecutive discovery windows. A value of "0" may mean that the mesh transmission window is not repeated, and a value of "1" may mean that the mesh transmission window is repeated, or vice versa. Bits 1-2 (487) may represent the whether the traffic is advertised on the mesh network 110 via a paging window (PW) or on the NAN channel 100 paging window (NAN-PW). A value of "0" may indicate a mesh channel paging window, meaning that the paging window is broadcast on the mesh channel 110, which may be advisable for multi-hop scenarios (i.e., scenarios where communicating members are more than 1-hop away from each other. A value of "1" may indicate a NAN channel paging window, meaning that the paging window is broadcast on the NAN channel 100. Values "2" and "3" are reserved for future embodiments. Bits 3-4 (488) may represent the Discovery Window Offset, conforming to the amount of time after the completion of the discovery window transmission that the mesh transmission window begins, set as follows. A value of "0" may indicate 0 time units (TU), meaning that no time elapses between the end of the discovery window transmission and the beginning of the first subsequent mesh transmission window. A value of "1" may indicate 16TU between the discovery window transmission end and the beginning of the subsequent mesh transmission window, "2" may indicate 32TU, and "3" may indicate 64TU. In other embodiments, the value of these bits may indicate other time units. Bits 5-6 (489) may represent the mesh transmission window offset, indicating the offset in time units between consecutive mesh transmission windows. This may be measured from the beginning of one transmission window to the beginning of the subsequent transmission window, or may be measured from the end of one transmission window to the beginning of the subsequent transmission window. A value of "0" may indicate 0TU, a value of "1" may indicate 16TU, "2" may indicate 32TU, and "3" may indicate 64TU. In other embodiments, the value of these bits may indicate other time units. Bits 7-8 (490) may represent the mesh transmission window size, representing the size of the mesh transmission window in time units, set as follows. A value of "0" may indicate 64 time units (TU), a value of "1" may indicate 128TU, "2" may indicate 256 TU, and "3" may be reserved. In other embodiments, the value of these bits may indicate other time units. In some embodiments, the transmission window size may include the size of the paging window (or duration of the paging window interval).

The information that bits 9-10 (491) represents may depend on the value of bits 1-2 (487). If bits 1-2 (487) is set to 0, then the bits 9-10 (491) represents the paging window (or paging window interval) size, indicating the size of the mesh paging window that occurs at the beginning of each mesh transmission window. In some embodiments, the size of the paging window may correlate to the duration of the paging window interval. When bits 1-2 (487) have a value of "0," a value of "0" in bits 9-10 (491) may indicate 2 time units (TU), a value of "1" may indicate 4TU, a value of "2" may indicate 8TU, and "3" may indicate 12TU. In other embodiments, the value of these bits may indicate other time units. If bits 1-2 (487) are set to 1, then the bits 9-10 (491) represent the NAN paging window repeat indicator, indicating how often the NAN paging window interval repeats between consecutive discovery windows. For example, when bits 1-2 (487) are set to 1, a value of "0" in bits 9-10 (491) equal a periodic repetition every 32TU, while "1" indicated a repeat period of 64TU, "2" indicating 128TU, and "3" indicating 256TU. Bits 11-12 (492) represent the mesh heartbeat. The mesh heartbeat indicates the time for which a mesh network will remain "alive" or ready for traffic communication without hearing a provider "heartbeat" to keep the mesh network alive. A heartbeat may be a beacon or any indicator broadcast by a provider on the mesh network to indicate its present on the mesh. If all providers leave a mesh network and no provider joins the mesh network or none of the other devices of the mesh network decide to become providers (i.e., transmitters of traffic) on the mesh network, then the mesh network will be dissolved and the devices 130 that were stations on the mesh will leave the mesh network 110. A value of "0" in bits 11-12 (492) may represent a heartbeat limit of 30 seconds, meaning a heartbeat must be heard from a provider by the devices of the mesh at least once every 30 seconds in order to maintain the mesh network in existence. A value of "1" in bits 11-12 (492) may represent a 60 second heartbeat, while a value of "2" in bits 11-12 (492) may represent a 120 second heartbeat, and a value of "3" in bits 11-12 (492) represents 300 seconds of heartbeat time-out. Bits 13-15 (493) may be reserved for future use.

Figure 4E:
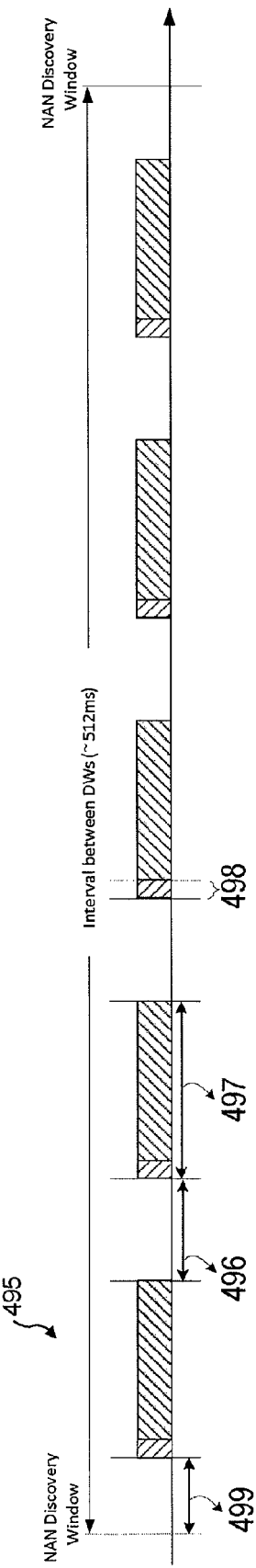
FIG. 4E shows an exemplary timing scheme for transmission windows and paging windows, in relation to an interval between discovery windows.

Referring to FIG. 4E, an exemplary timing scheme for transmission windows and paging window intervals, in relation to an interval between discovery windows is shown and generally designated 495. This embodiment may represent a mesh network 110a having a five transmission windows and paging windows during an interval between two discover windows. In this embodiment, the paging window is included in the size of the transmission window, and the mesh transmission window offset 496 represents the offset between the end of a transmission window and the beginning of the subsequent transmission window 497 (including the paging window 498). Mesh transmission offset 496 represents the offset discussed above with referenced to Bits 1-2 489. Mesh transmission offset 499 represents the offset between the discovery window 405 and the subsequent paging window, discussed above with reference to bits 3-4 (488). The mesh transmission windows size 497 may represent the Bits 3-4 490 discussed above. Paging window size 498 may represent the Bits 5-6 491 as discussed above when the bits 1-2 (487) contain a value of "0." In this embodiment, the mesh transmission repeat bit 486 may be set to "1" to indicate that the mesh transmission window does repeat during the NAN discovery window interval between consecutive discovery windows (here a time of roughly 512 ms).

Figure 4F:
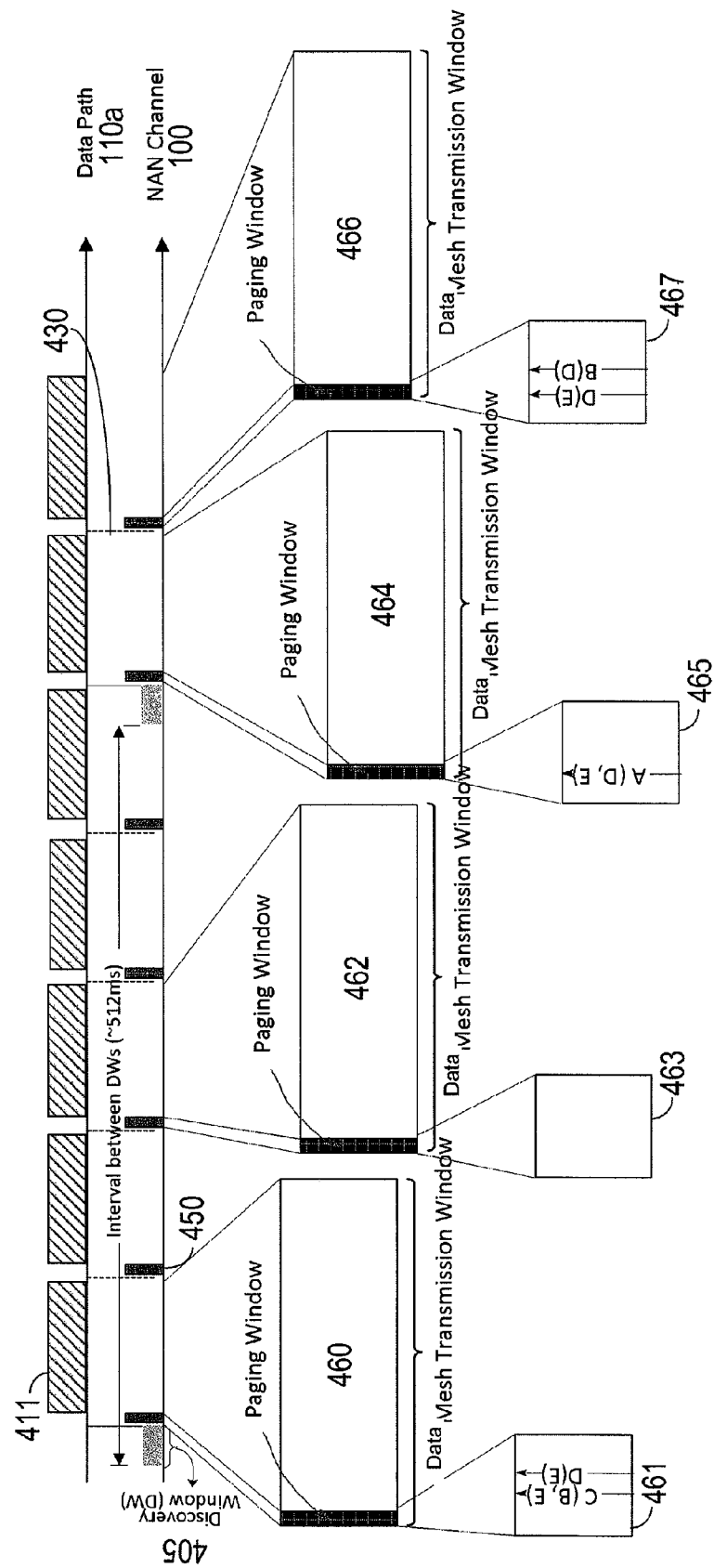
FIG. 4F represents a sequence of discovery windows, discovery beacons, and paging windows on a NAN network and transmission windows on data delivery networks in accordance with an exemplary embodiment.

FIG. 4F represents a sequence of discovery windows 405, discovery beacons 430, and paging windows 450 on a NAN channel 100 and transmission windows 411 on a data delivery network. In the depicted embodiment (intended to be exemplary and not limiting), there are five paging windows 450 and transmission windows 411 between subsequent discovery windows 405. As depicted, the discovery beacons 430 occur at periodic intervals between the discovery windows 405 such that there are, for example, 4 discovery beacons 430 between subsequent discovery windows 405. The NAN paging window 450 may be broadcast immediately after the discover window 405 is broadcast on the NAN channel 100. In some embodiments, the NAN paging window 450 may be periodically repeated between consecutive discovery windows 405 after the discovery beacons 430 are broadcast. The NAN paging windows 450 may occur as often as the transmission windows 411 on the mesh network 110a. The NAN paging window 450 may be broadcast only once between discovery beacons regardless of how many mesh networks 110 exist. A mesh transmission window 411 on the mesh network 110a immediately follows the NAN paging windows 450 on the NAN channel 100. When multiple mesh networks 110 exist, the mesh transmission windows 411 for each mesh network 110 will follow the NAN paging window 450 before the next NAN paging window 450 is broadcast, so that a device 130 that is a member of multiple mesh networks 110 may be able to monitor traffic on each of the mesh networks 110 before returning to the NAN channel 100 for the next discovery beacon 430 and NAN paging window 450.

The depicted embodiment may be useful in 1-hop scenarios (i.e., scenarios where all the devices 130 are within 1-hop of each other. In such embodiments, the NAN channel 100 may broadcast traffic advertisements (i.e., NAN paging windows 450 comprising notifications that traffic for a specific destination device or group of destination devices is accessible) as opposed to or in addition to broadcasting traffic advertisements (i.e., paging windows (not shown on this figure)) on the mesh networks 110. Broadcasting the traffic advertisements may allow devices 130 that do not have traffic pending for transmission to them on the mesh networks 110 to avoid the resource expensive switching to a mesh network 110 unnecessarily (i.e., when there is no traffic waiting for the switching device 130), and instead switch to the mesh networks 110 only when necessary (i.e., traffic is indicated as being ready for transmission to the device 130) or when desired by the device 130 (i.e., the device 130 wants to transmit traffic on the mesh network 110). The periodicity of the NAN paging window 450 may match the periodicity of the mesh network 110a transmission windows 411, such that a device 130 that is a member of the mesh network 110a but is monitoring the NAN channel 100 will be able to receive the NAN paging window 450 and be able to switch to the mesh network 110a in time to monitor the transmission window 411 for traffic intended for the device 130.

Broadcasting the NAN paging window 450 immediately after the discovery window 405 is broadcast on the NAN channel 100 may ensure that the receiving devices 130 are awake for the NAN paging window 450. In some embodiments, the NAN paging window 450 may not be broadcast immediately after the discovery window 405, but the devices 130 will remain awake for the NAN paging window 450. In some embodiments, the devices 130 may not remain awake for the NAN paging window 450. Repeating the NAN paging window 450 frequently between consecutive discover windows 405 may reduce the latency. In some embodiments, the size of the NAN paging window 450 may be limited, e.g., to 5TU, while some embodiments may not have a NAN paging windows 450 of a limited size and may be expandable dependent upon the number of mesh networks 110 that exist and the number of advertisements necessary to inform all devices 130 of pending traffic on the various mesh networks 110. In some embodiments, the NAN channel 100 may support dual-band operation, where various communications may be split across the different bands. For example, a NAN channel 100 may support a 2.4 GHz channel and a 5 GHz channel, where the 5 GHz channel may be designated as the default NAN data path and the 2.4 GHz channel may be used for incidental communications or data transfer. In such embodiments, the NAN paging window 450 may be broadcast on the default NAN data path (i.e., the 5 GHz channel as described above).

The traffic announcements of the NAN paging windows 450 may include sufficient information to clearly identify what recipient device 130 it is addressed to and to what service and/or mesh it pertains. For example, the traffic announcements of the NAN paging window 450 may comprise at least one of the service, sender device 130, receiver device 130, or a mesh network identifier, among other information.

As discussed above, TIM bits may be communicated in paging windows so that all devices 130 on the various data delivery networks may reliably receive them. For example, when the TIM bits are communicated in the NAN paging window 450, the TIM bits could be aggregate TIM bits comprising information for multiple devices belong to multiple mesh networks. The devices 130 belonging to any of the multiple mesh networks may receive the TIM bits indicating traffic for the devices 130 from the aggregate TIM bit, as described below. In some embodiments, where the paging window is specific to a particular mesh, the TIM bits may indicate traffic corresponding to devices 130 that are members of that specific mesh (as described above). The structure and purpose of the TIM bits are the same as those described above in reference to FIG. 4C and will not be described again here. In addition to that described above, in situations where a transmitting device 130 participates in multiple mesh networks 110 and has pending traffic to broadcast on multiple of the mesh networks 110, a single, aggregated TIM may be used to advertise all pending traffic at one time. Accordingly, the TIM bits may comprise aggregated information for traffic on multiple mesh networks 110. In some embodiments, the association ID (AID) space of the TIM may be split between the different mesh networks 110 for which traffic advertisements may be broadcast. For example, if three mesh networks 110a, 110b, and 110c have traffic advertisements to broadcast, then the AID space of the TIM may be split into at least three portions, one for each mesh network 110. Additionally, since the AID between neighboring devices 130 may be unique to a mesh network 110, the AID may be another method for a transmitting device 130 to identify the mesh network 110 without referring to the mesh network channel number or other identifying information.

In the embodiment depicted in FIG. 4F, a NAN paging window 450 may indicate that a source of broadcast traffic intends to transmit and sets the TIM bits of all devices 130 to "1" to indicate that each device 130 has traffic to be transmitted to it. Additionally, an additional source may indicate unicast traffic by setting the TIM bits associated with the recipients of the unicast traffic to "1" to indicate waiting traffic. Accordingly, during the transmission window 411, since the broadcast source set the TIM bits of all devices 130 to "1", all the devices of the mesh network 110a may remain awake to receive the broadcast traffic. Additionally, during this transmission window 411, the unicast source will also transmit its traffic to the devices 130 that have their TIM bit set by the unicast source.

For example, NAN paging window 461 may depict a device 130c having set the TIM bits of devices 130l, and 130e, indicating that device 130c has traffic for devices 130b and 130e on the mesh network 100. At the same time, device 130d has set the TIM bit of device 130e, indicating traffic for 130e on the mesh network 110a. Thus, during the remainder of the transmission window 460 (corresponding transmission window 411), devices 130b, 130c, and 130e will switch to the mesh network 110a to exchange traffic and devices 130d and 130e will switch to the mesh network 110a to exchange traffic. Device 130a may go to sleep or enter an energy savings mode (to save battery and conserve energy usage) as it has no incoming or outgoing traffic. After the traffic has been received by the appropriate destination devices, all the devices 130 may switch back to the NAN channel 110 for monitor the subsequent NAN paging window 450 and subsequent beacons 430.

The third NAN paging window 463 may indicate that a no source of traffic intends to transmit traffic and thus none of the TIM bits of any device 130 is set to "1". Accordingly, during the remainder of the associated mesh transmission window 442, since each of the TIM bits of each of the devices 130 are "0", each of the devices 130 may go to sleep. The sixth NAN paging window 465 may indicate that a source of broadcast traffic (device 130a) intends to transmit traffic and sets the TIM bits of devices 130d and 130e to "1" to indicate that those devices 130 have traffic to be transmitted to them. Accordingly, during the remainder of the associated transmission window 464, since the device 130a set the TIM bits of devices 130d and e to "1", the devices 130a, 130d, and 130e may remain awake and may switch to the mesh network 110a to transmit and receive the respective traffic. The remaining devices 130 that do not have their indicator bits set to "1" may go to sleep to conserve battery life, unless the TIM is indicating broadcast traffic, as described above. During the seventh NAN paging window 467, the NAN paging window 467 may indicate that devices 130d intends to broadcast traffic to device 130e while device 130b intends to broadcast traffic to device 130d by setting the respective TIM bits (e.g., 130e and 130d) to '1.' Accordingly, during the remainder of transmission window 466, the devices 130b, 130d, and 130e may each switch to mesh network 110a and transmit and/or receive their respective traffic. The remaining devices 130 may switch to power save mode during a transmission window 411 if its TIM bit is not set to indicate traffic to send or receive in the corresponding paging window NAN 450. Devices 130 that do not have their respective TIM bits set in the NAN paging windows 450 may refrain from switching to the mesh network 110a and may instead go to "sleep" until the subsequent discover beacon 430.

Accordingly, the sequence of discovery windows 405, beacons 430, and the NAN paging windows 450 may represent a first synchronization information for a first and at least a second communication channel. In some embodiments, the discovery window 405 may comprise the first synchronization information for the NAN channel 100 (i.e., the first communication channel). The discovery window 405, as discussed above, may comprise information regarding the services provided by all the devices 130 of the NAN. The NAN paging windows 450 may represent the second synchronization information and may provide information regarding the information for transmission to specific devices 130 on specific mesh networks, each of the specific mesh networks being an additional communication channel.

Figure 5:
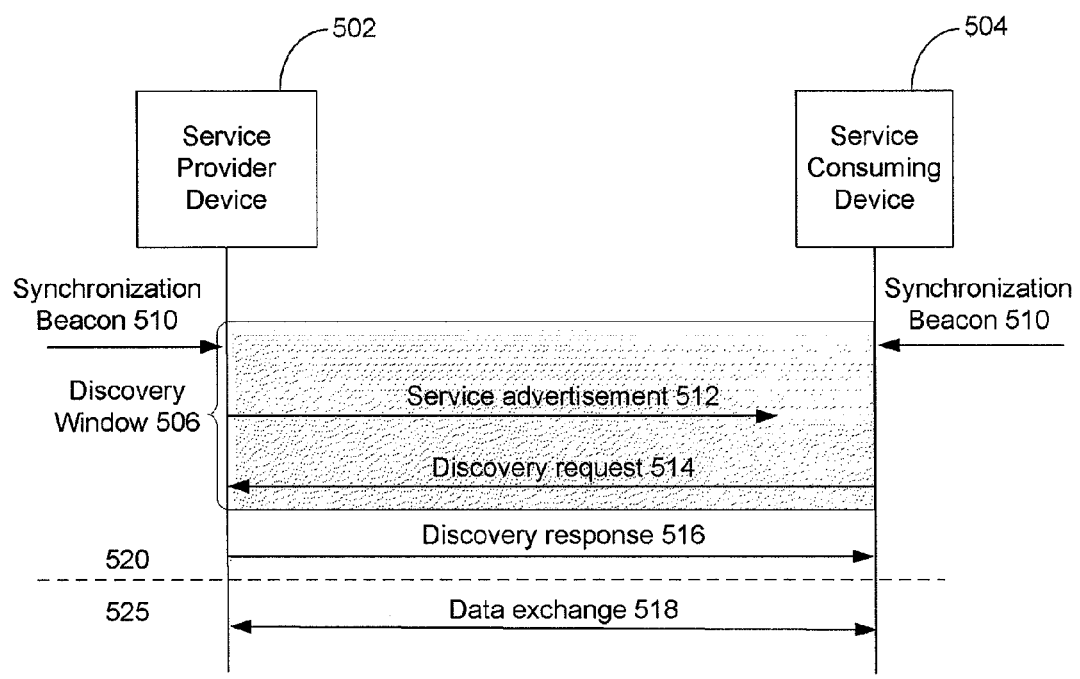
FIG. 5 illustrates the communications exchanged between a service providing device and a service consuming device.

Referring to FIG. 5, a call flow diagram of an exemplary instance of a discovery window communication between a service providing device and service consuming device is shown and generally designated 500. FIG. 5 shows two devices, devices service provider 502 and service consumer 504. Service provider 502 is the service provider providing a service and service consumer 504 is the service consumer seeking the service provided by service provider 502. An exchange of signals between the devices that occur both on the NAN 520 and mesh network 525 is shown. The discovery window 506 on the NAN 520 may begin with a synchronization beacon 510. As shown, both service provider 502 and service consumer 504 receive the synchronization beacon, as would any other devices on the NAN 520. This synchronization beacon, as discussed above, is used to maintain synchronization across all mesh networks to which any devices 130 belong. Paging windows, paging window intervals, and transmission windows for all mesh networks 525 may be based on the synchronization information of the NAN 520. Additionally, during the discovery window 506, service provider 502 may broadcast a service advertisement 512 on the NAN 520. In response to such a broadcast, service consumer 504 may send a discovery request 514 to the service provider 502. The service provider 502 may respond to the discovery request 514 with a discovery response 516 which may include the information necessary for the service consumer 504 to join the associated mesh network 525. Once service consumer 504 has joined the mesh network 110 on which service provider 502 is providing a service, data exchange 518 may begin on the mesh network 110. In some embodiments, the synchronization beacon 510 may comprise information regarding the service advertisement 512.

In operation, NAN 520 correlates to the wireless NAN 100, and mesh network 525 correlates to the mesh network 110 upon which a mesh network is operating. The FIG. 5 is merely an exemplary instance and need not be the standard. The synchronization beacon 510, service advertisement 512, and discovery request 514 may occur within the discovery window 506. Additionally, the synchronization beacon 510, the service advertisement 512, the discovery request 514, and the discovery response may all occur on NAN 520. The data exchange 518 between the service provider and the service consuming device may occur on the mesh network 525. In some aspects, the data exchange 518 may occur on the NAN 520 if bandwidth provides. In some aspects, the discovery request 514 and discovery response 516 may be over a mesh network 525. In some aspects, these determinations may be based upon NAN 520 loading. Alternatively, the discovery request 514 and discovery response 516 could take place over a third network not depicted by FIG. 5.

In an embodiment, the service advertisement 512 from service provider 502 may include all necessary information (e.g., channel, paging window offset, number of devices, etc.) related to joining the service mesh network 110 such that service consumer 504 may not need to submit a discovery request 514, thereby eliminating the discovery response 516. Alternatively, service provider 502 may not broadcast a service advertisement 512, instead only responding to a discovery request 514 from service consumer 504 with a discovery response 516. Additionally, the synchronization beacon 510 may come before or after any service advertisement 512 or discovery request 514 in the discovery window 506.

Figure 6:
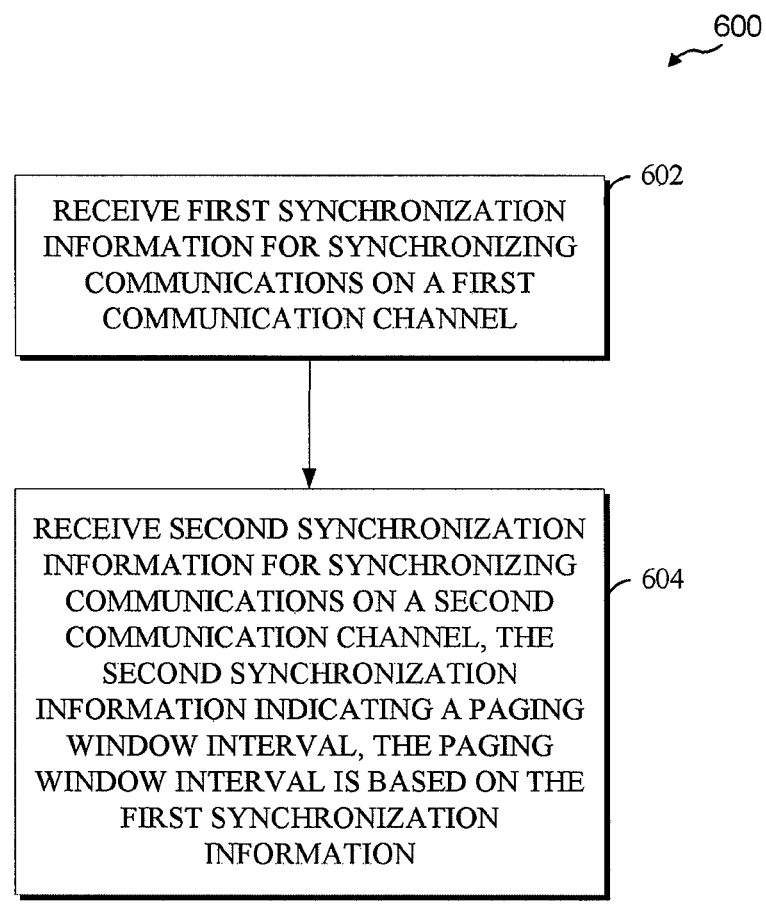
FIG. 6 is a flowchart of a method of receiving service data over a service data delivery network.

FIG. 6 is a flowchart of a method of receiving service data over a service data delivery network. Process 600 may be performed, in some aspects, by any of wireless devices 130a-130l and/or the wireless device 302. In some aspects, process 600 may be performed by a device already receiving service data on an infrastructure-less network. Service data may include any data being transmitted on one of the mesh networks 110. The service data may include data associated with applications or services being offered on the mesh network 110.

To ensure adequate network capacity, process 600 may utilize separate communication channels for communication of synchronization information and service data delivery. While timing synchronization may be performed on the service discovery channel, it may not be performed separately for the service delivery channel (e.g., wireless network 100). Instead, communication on the service delivery channel is synchronized based on synchronization information determined from the service discovery channel. By utilizing separate communications channels, communications overhead associated with beaconing on the first communications channel may be leveraged by the second communications channel, reducing an amount of network capacity utilized to maintain the service delivery networks/channels. As discussed above, the synchronization information from the NAN 100 may include any information used by the NAN 100 to synchronize timing operations across all connected devices. The synchronization information may indicate a discovery window for the NAN 100 or may include beaconing or other synchronization mechanisms that may be used to synchronize the mesh networks 110.

In block 602, first synchronization information for synchronizing communications on a first communication channel is received from the NAN 100. As depicted in FIG. 5, the receiving of first synchronization information for the first communication channel may occur during the discovery window 506. In some aspects, the information received may be substantially similar to or include service advertisements 512 as described in FIG. 5. In other aspects, the information received may be substantially similar to or include receiving a synchronization beacon. In some other aspects, the information received may be substantially similar to or include discovery requests 514 as described in FIG. 5. The synchronization information may indicate the discovery window or include beaconing or another synchronization mechanism, as discussed above.

In block 604, the device receives second synchronization information for synchronizing communications on a second communication channel. This receipt of information may occur over the first communication channel. In some embodiments, the receipt of this information may occur over a channel other than the NAN 100. The second synchronization information for the second communication channel may indicate information regarding the paging window, paging window interval and transmission window, e.g., the offset from the discovery window, the beacons available in the paging window, size of the paging window and transmission window. This second synchronization information and the paging window interval are based on the first synchronization information in that the paging window is offset from the discovery window. Additionally, the receiving of the paging window and transmission window may not be concurrent with either the receiving of the discovery window of the first communication channel or the receiving of a paging window from another communication channel. The device 130 may use the synchronization information for the mesh networks 110 to determine when it needs to switch between receiving on different mesh networks 110 to listen to the discovery windows and respective paging windows and transmission windows for the respective mesh networks. In some aspects, the receiving of first synchronization information for a first communication channel of block 604 could occur during the discovery window 506 of the NAN 100 as depicted in FIG. 5.

Some aspects of process 600 further include using the information of block 604 to determine the discovery window 405 depicted on FIG. 4 for the first communication channel and the paging window and transmission window, e.g., 410 depicted on FIG. 4 for the second communication channel. In some aspects, process 600 is performed by devices already receiving service data from another provider or are providers for other service data.

Figure 7:
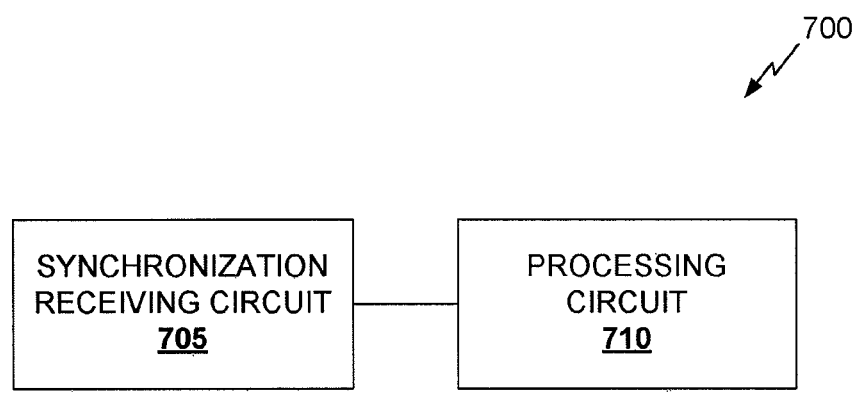
FIG. 7 is a function block diagram of a receiving device operating on a wireless network of FIG. 1b.

FIG. 7 is a functional block diagram of an exemplary wireless device 700 that may be employed within the wireless network 100. The device 700 comprises a synchronization receiving circuit 705. The synchronization receiving circuit 705 may be configured to perform one or more of the functions discussed above with respect to the blocks 602 and 604 illustrated in FIG. 6. The synchronization receiving circuit 705 may correspond to one or more of the receiver 312, the transceiver 314, and/or the processor 304. The device 700 further comprises a processing circuit 710. The processing circuit 710 may be configured to perform one or more of the functions discussed above with respect to block 604 illustrated in FIG. 6. The service receiving circuit 710 may correspond to the processor 304, transceiver 314, or receiver 312.

Figure 8:
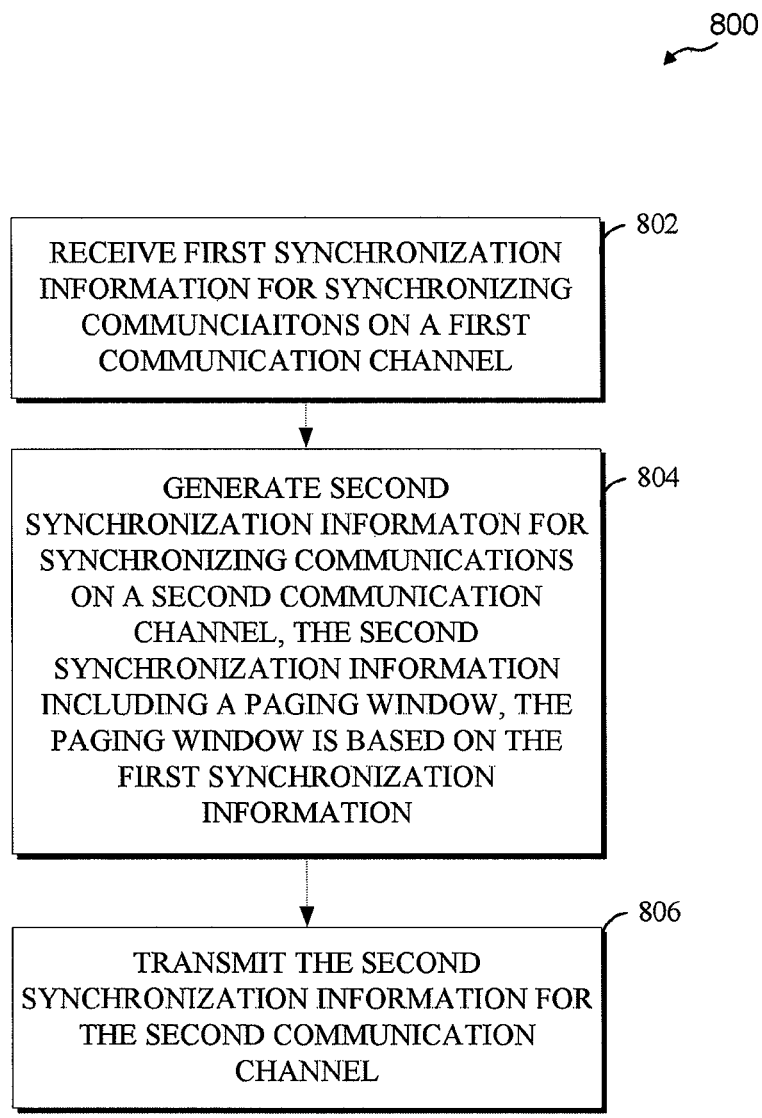
FIG. 8 is a flowchart of a method of transmitting service data over a service data delivery network.

Referring now to FIG. 8, a flowchart of a method of transmitting service data over a service data delivery network is depicted and generally designated 800. Process 800 may be performed, in some aspects, by any of wireless devices 130a-l and/or the wireless device 302. In some aspects, process 800 may be performed by a device already providing service data on an infrastructure-less network.

Dependent upon network capacity, process 800 may utilize separate communication channels for communication of synchronization information and service data delivery. While timing synchronization may be performed on the service discovery channel, it may not be performed separately for the service delivery channel. Instead, communication on the service delivery channel is synchronized based on synchronization information determined from the service discovery channel. By utilizing separate communications channels, communications overhead associated with beaconing on the first communications channel may be leveraged by the second communications channel, reducing an amount of network capacity utilized to maintain the service delivery networks/channels.

At block 802 of method 800, a service producing device (such as device 130a) may receive a first synchronization information for synchronizing communications on a first communication channel. In some aspects, the first synchronization information may be received over the first communication channel. In some aspects, the first communication channel may be channel 6 in 802.11s standards of a wireless network. In some aspects, the block 802 receipt of synchronization information may occur during a discovery window on the NAN 100.

At block 804, the device generates second synchronization information for synchronizing communications on a second communication channel. This involves the device processing the first synchronization information received at block 802 above and determining the offset required for the paging window interval for the second communication channel. In some aspects, the generating process may occur while also broadcasting service advertisements 512, as depicted in FIG. 5. The paging window interval is based on the first synchronization information and is transmitted non-concurrently and synchronized with the first synchronization information.

In block 806, the device transmits the second synchronization information to devices interested in the service. In some aspects, the device transmits to specific service consumer devices 504 as depicted in FIG. 5. In other aspects, the device transmits to all devices on the wireless network 100 via a service advertisement 512 from FIG. 5. In some other aspects, the second synchronization information may only be transmitted in response to discovery requests 514 as depicted in FIG. 5. In some aspects, the synchronization information may be for a second communication channel to be provided by the device, e.g., in a situation where the device is provide two or more services.

Figure 9:
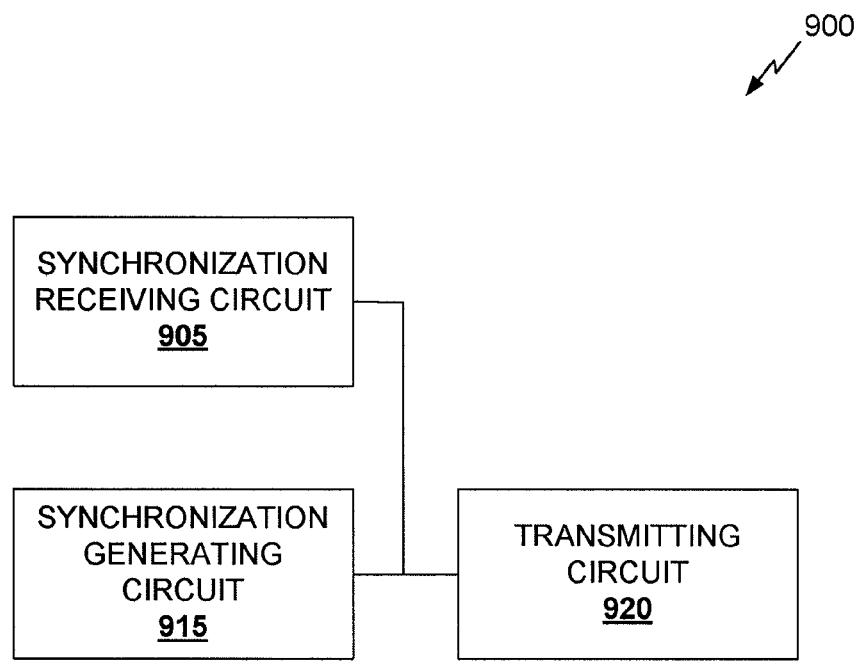
FIG. 9 is a function block diagram of a transmitting device operating on a wireless network of FIG. 1b.

FIG. 9 is a functional block diagram of an exemplary wireless device 900 that may be employed within the wireless network 100. The device 900 comprises a synchronization receiving circuit 905. The synchronization receiving circuit 905 may be configured to perform one or more of the functions discussed above with respect to the block 802 illustrated in FIG. 8. The synchronization receiving circuit 905 may correspond to one or more of the receiver 312; transceiver 314, and/or the processor 304. The device 900 further comprises a synchronization generating circuit 915. The synchronization generating circuit 915 may be configured to perform one or more of the functions discussed above with respect to block 806 illustrated in FIG. 8. The synchronization generating circuit 915 may correspond to the processor 304. The device 900 further comprises a transmitting circuit 920. The transmitting circuit 920 may be configured to perform one or more of the functions discussed above with respect to block 810 illustrated in FIG. 8. The transmitting circuit 920 may correspond to the transmitter 310, the transceiver 314, and/or the processor 304.

Figure 10:
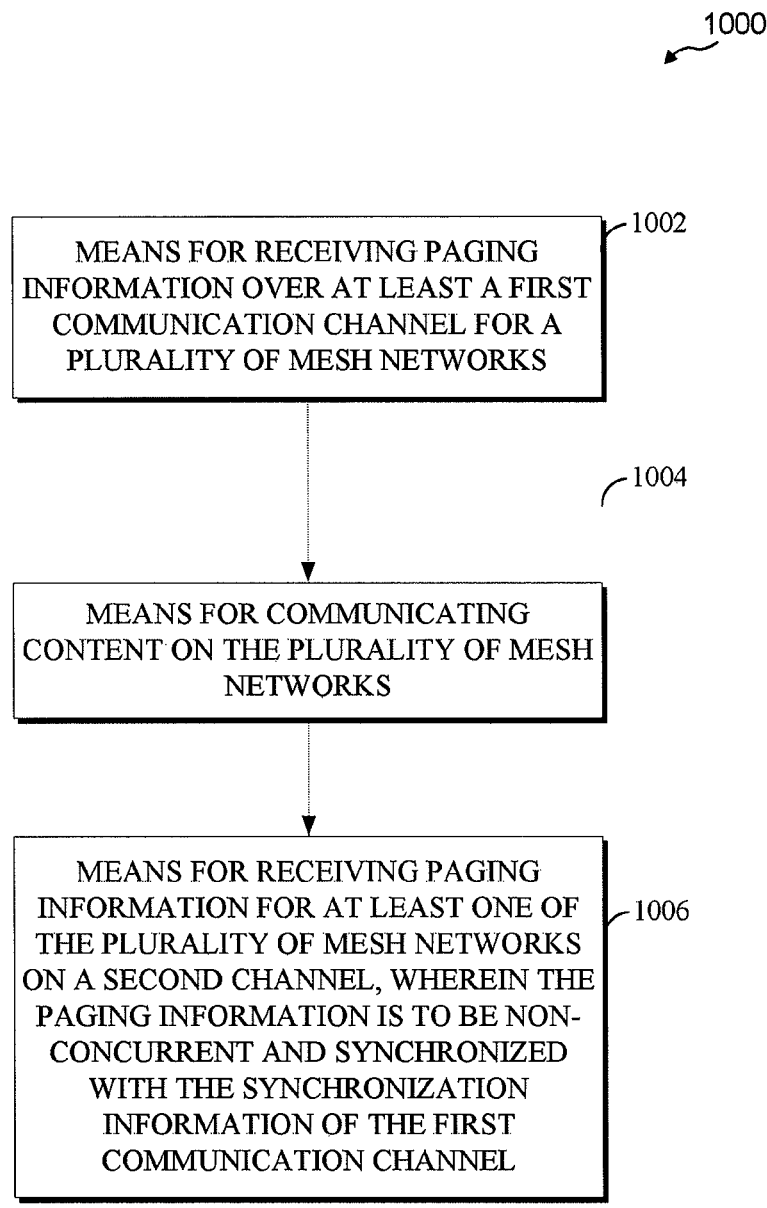
FIG. 10 is flow chart for an apparatus for receiving paging information on a peer-to-peer network.

Referring now to FIG. 10, a flowchart diagram depicting an exemplary embodiment of an apparatus for receiving paging information over a peer-to-peer network is depicted and generally designated 1000. Process 1000 may be performed, in some aspects, by any of wireless devices 130a-130l and/or the wireless device 302. In some aspects, process 1000 may be performed by a device already providing service data on an infrastructure-less network.

At block 1002 of method 1000, a service consuming device (such as device 130a) has a means for receiving synchronization information over at least a first channel for a plurality of mesh networks 110. In one aspect, the means for receiving synchronization information comprises transceiver 314 of FIG. 3. In other aspects, the means for receiving synchronization information comprises processor 304 of FIG. 3. In some other aspects, the means for receiving synchronization information comprises receiver 312 of FIG. 3.

At block 1004 of method 1000, the device has a means for communicating content on a plurality of mesh networks 110. In one aspect, the means for communicating content comprises transmitter 310 of FIG. 3. In other aspects, the means for communicating content comprises processor 304 of FIG. 3.

At block 1006 of method 1000, the device has a means for receiving paging information for at least one of the mesh networks 110 on at least a second channel, wherein the paging information is to be non-concurrent and synchronized with the synchronization information of the first network. In one aspect, the means for receiving paging information comprises receiver 312 of FIG. 3. In other aspects, the means for receiving paging information comprises transceiver 314 of FIG. 3. In some other aspects, the means for receiving paging information comprises processor 304 of FIG. 3.

FIG. 11 shows another possible organization of a neighbor aware network comprising a plurality of devices 130 participating in a plurality of mesh networks 110. A plurality of devices 130 participating in a social Wi-Fi mesh network, or NAN, is shown. Each of the plurality of devices 130 may be using at least one service designated by at least one of mesh networks 1110, 1120, 1130, and/or 1140. Each of the services 1150 of the mesh networks 1110, 1120, 1130, and 1140, may, with each respective mesh network, comprise a common service, a common operating system, a common platform (e.g., a particular brand of smartphone, or computer), or other relevant commonality between each of the devices that are part of that respective mesh network. Each of the mesh networks 1110, 1120, 1130, and 1140 may then comprise an individual mesh network. It follows then, that the Social Wi-Fi network or NAN 1100 may comprise multiple mesh networks 1110, 1120, 1130, and 1140. Accordingly, the mesh networks 1110, 1120, 1130, and 1140 may alternatively be referred to as mesh 1110, mesh 1120, mesh 1130, and mesh 1140. As a non-limiting example, the mesh 1110 of NAN devices may form a Social Wi-Fi mesh for transport of data or GPS services.

In an embodiment, a further abstraction may be implemented, delineating what particular applications 1150 might be supported by the particular mesh network. In an embodiment, the devices that are part of the meshes 1110, 1120, 1130, and 1140 (i.e., participating in the respective Social Wi-Fi mesh networks) may normally act as a proxy for service discovery packets (as described above) for all the services supported by the mesh network, while also forwarding the data associated with the services supported by the particular mesh, for example the meshes 1110, 1120, 1130, and 1140. Therefore each mesh network may comprise a plurality of devices that consume and/or proxy one or more of the mesh network's services.

As a non-limiting example, a device 130 (FIG. 1A) seeking a particular service may join the cluster 1100. Accordingly, the device 130 may then serve as a proxy device 130 for the services provided by the cluster 1100. In an embodiment, the cluster 1100 may provide multiple services similar to the applications 1150a and 1150b provided by mesh 1110 and the applications 1150c-1150e provided by mesh 1120. If the proxy device 130 joins such a mesh that provides multiple services (e.g., mesh 1120) but only seeks a single a service (e.g., application 1150d), the proxy device 130 may still proxy for the other services provided by the mesh 1120 (e.g., applications 1150c and 1150e).

Additionally, mesh 1130 comprises devices 130 that are also part of other mesh networks, specifically mesh 1120 and 1140 (e.g., devices 130e, 130f, and 130g). Accordingly, the device 130 that is a member of more than one mesh network is capable of providing or seeking or proxying services from all of the applications 1150 supported by any of the mesh networks to which the device 130 belongs. Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for receiving timing information over a peer-to-peer network, comprising:
    receiving first synchronization information comprising first timing information for synchronizing network communications on a first communication channel; and
    receiving second synchronization information comprising second timing information for synchronizing communications on a second communication channel, the second synchronization information indicating a paging window interval communicated on the second communication channel, the paging window interval comprising a period during which at least one of beacons and data structures is communicated, the paging window interval is based on the first synchronization information, wherein receiving the paging window interval is non-concurrent and synchronized with the receiving of the first synchronization information.

2. The method of claim 1, wherein the paging window interval is used to coordinate sleep times of devices on the peer-to-peer network.

3. The method of claim 1, further comprising receiving service data on the second communication channel, the receiving of service data is based at least in part on the second synchronization information.

4. The method of claim 3, wherein the service data includes at least one of video, games, music, and images, as the service data.

5. The method of claim 1, further comprising receiving an additional synchronization information for each of one or more additional communication channels, each additional synchronization information indicating an additional paging window interval, the additional paging window interval is based on the first synchronization information, wherein the receiving of each additional paging window interval is non-concurrent and synchronized with the receiving of the first synchronization information and the paging window interval communicated on the second communication channel.

6. The method of claim 5, further comprising receiving the additional synchronization information for each of the one or more additional communication channels on the first communication channel.

7. The method of claim 1, wherein the second synchronization information further comprises a start-time offset for a data transmission window communicated on the second communication channel, the start-time offset is based on the first synchronization information.

8. The method of claim 1, wherein the paging window interval comprises the period during which information indicating a start-time offset for a data transmission window, the start-time offset indicating when the data transmission window begins in relation to the paging window interval, the start-time offset is based on the first synchronization information, is communicated.

9. The method of claim 1, wherein the paging window interval comprises the period during which at least one of a routing message, an authentication and association message, and a group key announcement and exchange message is communicated.

10. The method of claim 9, wherein the routing message comprises at least one of a path request message, a path reply message, and a root announcement message.

11. The method of claim 1, further comprising:
    identifying a discovery window communicated on the first communication channel, the discovery window comprising an interval when devices on the peer-to-peer network monitor the first communication channel, and the identifying of the discovery window is based on the first synchronization information; and
    determining the paging window interval for the second communication channel, the determining of the paging window interval is based at least in part on the discovery window and an offset, the offset is based at least in part on the paging window interval size.

12. The method of claim 11 further comprising identifying that the paging window interval communicated on the second communication channel is offset from the discovery window communicated on the first communication channel.

13. The method of claim 12, further comprising receiving service data on the second communication channel wherein the service data received on the second communication channel is different from service data provided on another communication channel.

14. The method of claim 11, further comprising:
    identifying, from the discovery window communicated on the first communication channel, a service providing device providing service data on the second communication channel; and
    receiving the service data from the service providing device on the second communication channel.

15. The method of claim 14, further comprising switching the receiving of the service data from the service providing device to the receiving of the first synchronization information, the first synchronization information including the discovery window.

16. The method of claim 1, wherein the receiving of the first synchronization information occurs on a different channel than the receiving of the second synchronization information.

17. A method for providing timing information over a peer-to-peer network, comprising:
    receiving first synchronization information for synchronizing communications on a first communication channel;
    generating second synchronization information for synchronizing communications on a second communication channel, the second synchronization information indicating a first paging window interval communicated on the second communication channel, the first paging window interval comprising a time during which at least one of beacons and data structures is communicated on the second communication channel, the first paging window interval is based on the first synchronization information, the first paging window interval is transmitted non-concurrently and synchronized with the first synchronization information; and
    transmitting the second synchronization information to a peer device on the peer-to-peer network.

18. The method of claim 17, further comprising transmitting the second synchronization information on the first communication channel.

19. The method of claim 17, further comprising:
generating a third synchronization information for synchronizing communication on a third communication channel; and
transmitting the third synchronization information on the first communication channel.

20. The method of claim 19, further comprising transmitting service data on the third communication channel.

21. The method of claim 20, wherein the service data transmitted on the third communication channel is different from service data provided on another communication channel.

22. The method of claim 19, wherein the third synchronization information includes information about a second paging window interval communicated on the third communication channel, and wherein the second paging window interval communicated on the third communication channel is offset from the first paging window interval communicated on the second communication channel by a multiple of a paging window interval size.

23. The method of claim 17, further comprising:
identifying a discovery window communicated on the first communication channel, the discovery window comprising an interval when devices on the peer-to-peer network monitor the first communication channel, the identifying of the discovery window is based on the first synchronization information;
generating the first paging window interval communicated on the second communication channel, the first paging window interval is based at least in part on the discovery window, and an offset, wherein the offset is a multiple of a paging window interval size.

24. An apparatus for receiving timing information over an infrastructure-less network comprising:
a processor configured to:
receive first synchronization information for synchronizing communications on a first communication channel;
receive second synchronization information for synchronizing communications on a second communication channel, the second synchronization information indicating a paging window interval, the paging window interval comprising a period during which at least one of beacons and data structures is communicated on the second communication channel, the paging window interval is based at least in part on the first synchronization information, wherein the receipt of the paging window interval is non-concurrent and synchronized with the receipt of the first synchronization information; and
transmit communications on the first and second communication channels.

25. The apparatus of claim 24, wherein the processor is further configured to receive service data on the first or second communication channel following the first and second synchronization information.

26. The apparatus of claim 24, wherein the processor is further configured to switch between being configured to receive a discovery window on the first communication channel, the discovery window comprising an interval when devices on the peer-to-peer network monitor the first communication channel, and the discovery window is based on the first synchronization information, and being configured to receive service data on the second communication channel.

27. An apparatus for transmitting timing information over an infrastructure-less network comprising:
a processor, configured to:
receive first synchronization information for synchronizing communications on a first communication channel;
generate for transmission second synchronization information for synchronizing communications on a second communication channel, the second synchronization information indicating a paging window interval communicated on the second communication channel, the paging window interval comprising a time during which at least one of beacons and data structures is communicated on the second communication channel, the paging window interval is based at least in part on the first synchronization information, wherein the paging window interval is communicated non-concurrently and synchronized with the first synchronization information of; and
transmit the second synchronization information to at least one peer device on the peer-to-peer network.

28. The apparatus of claim 27, further comprising:
the processor further configured to generate for transmission third synchronization information for synchronizing communications on a third communication channel and further configured to transmit the third synchronization information to the at least one peer device on the peer-to-peer network.

29. The apparatus of claim 27, wherein the processor is further configured to:
identify a discovery window communicated on the first communication channel, the discovery window comprising an interval when devices on the peer-to-peer network monitor the first communication channel, the processor configured to identify the discovery window based at least in part on the first synchronization information; and
generate an offset for the paging window interval, wherein the offset is a multiple of a paging window interval size.

30. The apparatus of claim 27, wherein the processor is further configured to establish communications with the at least one peer device on the peer-to-peer network on at least one of a plurality of data delivery networks for content delivery, wherein synchronization of communications on the plurality of data delivery networks is maintained via a synchronization mechanism of each of the plurality of data delivery networks.

* * * * *